United States Patent
Vassilieva et al.

(10) Patent No.: US 10,063,317 B2
(45) Date of Patent: Aug. 28, 2018

(54) NETWORK MANAGEMENT WITH PER-NODE CROSS-PHASE-MODULATION (XPM) COMPENSATION

(71) Applicant: Fujitsu Limited, Kawasaki-shi, Kanagawa (JP)

(72) Inventors: Olga Vassilieva, Plano, TX (US); Inwoong Kim, Allen, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/686,947

(22) Filed: Aug. 25, 2017

(65) Prior Publication Data

US 2018/0167142 A1    Jun. 14, 2018

Related U.S. Application Data

(63) Continuation-in-part of application No. 15/373,289, filed on Dec. 8, 2016.

(51) Int. Cl.
*H04J 14/00*    (2006.01)
*H04B 10/2557*    (2013.01)
*H04J 14/02*    (2006.01)
*H04Q 11/00*    (2006.01)

(52) U.S. Cl.
CPC ...... *H04B 10/2557* (2013.01); *H04J 14/0212* (2013.01); *H04Q 11/0005* (2013.01); *H04Q 2011/0009* (2013.01); *H04Q 2011/0016* (2013.01); *H04Q 2011/0086* (2013.01)

(58) Field of Classification Search
CPC ............. H04B 10/2557; H04J 14/0212; H04Q 11/0005

See application file for complete search history.

(56) References Cited

U.S. PATENT DOCUMENTS

| 7,411,903 B2 | 8/2008 | Jang et al. | |
| 7,542,677 B2 | 6/2009 | Sekiya et al. | |
| 2005/0226629 A1* | 10/2005 | Ooi | H04B 10/25133 398/147 |
| 2005/0238362 A1* | 10/2005 | Sekiya | H04B 10/0795 398/147 |
| 2015/0288458 A1 | 10/2015 | Honda | |

OTHER PUBLICATIONS

Chris Xu, Optics Letters vol. 27, No. 18, pp. 1619-1621, Sep. 15, 2002.
Benjamin Foo, "Optoelectronic method for distributed compensation of XPM in long haul WDM system", OFC 2015 © OSA 2015, Th2A.24, 3 pages.
Benjamin Foo, "Distributed Nonlinearity Compensation of Dual-Polarization Signals Using Optoelectronics", IEEE Photonics Technology letters, vol. 28, No. 20, Oct. 15, 2016, pp. 2141-2144.
Ex Parte Quayle Action received for U.S. Appl. No. 15/373,289, mailed Feb. 8, 2018; 10 pages.

* cited by examiner

*Primary Examiner* — Tesfaldet Bocure
(74) *Attorney, Agent, or Firm* — Baker Botts L.L.P.

(57) ABSTRACT

A method and system for selective and per-node XPM compensation may separate wavelengths into short traveling wavelengths (STW) and long traveling wavelengths (LTW) based on transmission distance over their respective optical paths. XPM compensation at ROADM nodes may be selectively performed for the LTW, while the STW may be passed through without XPM compensation, among other functionality at the ROADM nodes.

20 Claims, 13 Drawing Sheets

NETWORK MANAGEMENT WITH PER-NODE CROSS-PHASE-MODULATION (XPM) COMPENSATION

CROSS-REFERENCE TO RELATED APPLICATION

This application is a continuation-in-part of U.S. patent application Ser. No. 15/373,289 filed Dec. 8, 2016, the contents of which is hereby incorporated by reference in its entirety.

BACKGROUND

Field of the Disclosure

The present disclosure relates generally to optical communication networks and, more particularly, to network management with per-node cross-phase modulation (XPM) compensation.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM).

As data rates for optical networks continue to increase, reaching up to 1 terabit/s (1T) and beyond, the demands on optical signal-to-noise ratios (OSNR) also increase, for example, due to the use of advanced modulation formats, such as QAM and PSK with dual polarization. In addition, phase shifts of optical signals transmitted over optical networks may be observed. The phase shift may be self-phase modulation (SPM) in which light interacts with an optical fiber during transmission. Additionally, XPM may occur in which one wavelength of light can alter the phase of another wavelength of light.

SUMMARY

In one aspect, a disclosed reconfigurable optical add-drop multiplexer (ROADM) may include a first wavelength selective switch (WSS) to switch groups of adjacent channels included in a wavelength division multiplexed (WDM) optical signal provided as input to the first WSS. In the ROADM, a group of adjacent channels may represent an optical band transmitted by the WDM optical signal. The ROADM may further include a first cross-phase modulation (XPM) compensator to receive a first group of the groups of adjacent channels from the first WSS. In the ROADM, the first XPM compensator may further include a feed-forward XPM regulation loop to generate an XPM control signal, the feed-forward XPM regulation loop including a dispersion compensation module (DCM) to add dispersion corresponding to a fraction of an effective length of a fiber optic span carrying the WDM optical signal subsequent to the ROADM. The first XPM compensator may still further include a phase modulator to receive the first group and to receive the XPM control signal, and to output an XPM compensated first group, and a second WSS to receive the XPM compensated first group.

In any of the disclosed embodiments, the ROADM may further include a plurality of XPM compensators in addition to the first XPM compensator to respectively receive additional groups of adjacent channels from the first WSS and to output XPM compensated groups to the second WSS.

In any of the disclosed embodiments of the ROADM, the second WSS may receive the XPM compensated groups and may switch channels corresponding to the WDM optical signal for transmission.

In any of the disclosed embodiments of the ROADM, the first XPM compensator may exclusively compensate a first subgroup for XPM, where the first group includes the first subgroup and at least one additional adjacent channel switched to the first XPM compensator by the first WSS. In the ROADM, the second WSS may drop the at least one adjacent channel received by the first XPM compensator.

In any of the disclosed embodiments of the ROADM, the first XPM compensator may further include a second input to the feed-forward XPM regulation loop to receive the WDM optical signal, and an optical bandpass filter applied to the second input to pass selected groups of adjacent channels from the WDM optical signal in the feed-forward XPM regulation loop.

In any of the disclosed embodiments of the ROADM, the first XPM compensator may be enabled to compensate XPM with polarization diversity for an X-polarization component and a Y-polarization component, while the first XPM compensator further includes a first phase modulator for compensating a first phase corresponding to the X-polarization component, and a second phase modulator for compensating a second phase corresponding to the Y-polarization component.

In another aspect, a disclosed optical system may include a first WSS to switch groups of adjacent channels included in a WDM optical signal provided as input to the first WSS. In the optical system, a group of adjacent channels may represent an optical band transmitted by the WDM optical signal. The optical system may further include a first XPM compensator to receive a first group of the groups of adjacent channels from the first WSS. In the optical system, the first XPM compensator may further include a feed-forward XPM regulation loop to generate an XPM control signal, the feed-forward XPM regulation loop including a DCM to add dispersion corresponding to a fraction of an effective length of a fiber optic span carrying the WDM optical signal subsequent to the optical system. The first XPM compensator may still further include a phase modulator to receive the first group and to receive the XPM control signal, and to output an XPM compensated first group, and a second WSS to receive the XPM compensated first group.

In any of the disclosed embodiments, the optical system may further include a plurality of XPM compensators in addition to the first XPM compensator to respectively receive additional groups of adjacent channels from the first WSS and to output XPM compensated groups to the second WSS.

In any of the disclosed embodiments of the optical system, the second WSS may receive the XPM compensated groups and may switch channels corresponding to the WDM optical signal for transmission.

In any of the disclosed embodiments of the optical system, the first XPM compensator may exclusively compensate a first subgroup for XPM, where the first group includes the first subgroup and at least one additional adjacent channel switched to the first XPM compensator by the first WSS. In the optical system, the second WSS may drop the at least one adjacent channel received by the first XPM compensator.

In any of the disclosed embodiments of the optical system, the first XPM compensator may further include a second input to the feed-forward XPM regulation loop to receive the WDM optical signal, and an optical bandpass filter applied to the second input to pass selected groups of adjacent channels from the WDM optical signal in the feed-forward XPM regulation loop.

In any of the disclosed embodiments of the optical system, the first XPM compensator may be enabled to compensate XPM with polarization diversity for an X-polarization component and a Y-polarization component, while the first XPM compensator further includes a first phase modulator for compensating a first phase corresponding to the X-polarization component, and a second phase modulator for compensating a second phase corresponding to the Y-polarization component.

In yet a further aspect, a disclosed method for XPM compensation of optical signals may include switching groups of adjacent channels included in a WDM optical signal provided as input to a first WSS. In the method, a group of adjacent channels may represent an optical band transmitted by the WDM optical signal. The method may include receiving a first group of the groups of adjacent channels from the first WSS at a first XPM compensator. In the method, the first XPM compensator may be enabled for generating an XPM control signal using a feed-forward XPM regulation loop, the feed-forward XPM regulation loop including a DCM to add dispersion corresponding to a fraction of an effective length of a fiber optic span carrying the WDM optical signal subsequent to a second WSS. In the method, the first XPM compensator may further be enabled for sending the first group and the XPM control signal to a phase modulator to output an XPM compensated first group, and receiving the XPM compensated first group at the second WSS.

In any of the disclosed embodiments, the method may further include receiving additional groups of adjacent channels from the first WSS, respectively sending the additional groups to corresponding plurality of XPM compensators in addition to the first XPM compensator, and outputting XPM compensated groups to the second WSS from the XPM compensators. In the method, the second WSS may receive the XPM compensated groups and may select channels corresponding to the WDM optical signal for transmission.

In any of the disclosed embodiments of the method, the first XPM compensator may exclusively compensates a first subgroup for XPM, where the first group includes the first subgroup and at least one additional adjacent channel switched to the first XPM compensator by the first WSS.

In any of the disclosed embodiments of the method, the second WSS may drop the at least one adjacent channel received by the first XPM compensator.

In any of the disclosed embodiments, the method may further include receiving the WDM optical signal at a second input to the feed-forward XPM regulation loop, and passing selected groups of adjacent channels from the WDM optical signal by an optical bandpass filter applied to the second input in the feed-forward XPM regulation loop.

In any of the disclosed embodiments, the method may further include compensating XPM with polarization diversity for an X-polarization component and a Y-polarization component using the first XPM compensator, including compensating a first phase corresponding to the X-polarization component using a first phase modulator, and compensating a second phase corresponding to the Y-polarization component using a second phase modulator.

In yet a further aspect, a reconfigurable optical add-drop multiplexer (ROADM) for selective per-node XPM compensation is disclosed. The ROADM may include a first optical splitter enabled to receive an optical signal comprising short-traveling wavelengths (STW) in a first group and long-traveling wavelengths (LTW) in a second group. In the ROADM, the first group and the second group may be spectrally separated from each other in the optical signal. The ROADM may also include a wavelength selective switch (WSS) enabled to receive the optical signal from the first optical splitter. In the ROADM, the WSS may be enabled to pass through the STW to the first group in an output optical signal. The ROADM may also include a second optical splitter enabled to receive the optical signal from the first optical splitter, and a first cross-phase modulation (XPM) compensation unit enabled to receive the STW and the LTW from the second optical splitter. In the ROADM, the LTW may be XPM compensated by the first XPM compensation unit and output as XPM compensated LTW, while the STW may be terminated at the first XPM compensation unit.

In any of the disclosed embodiments, the ROADM may further include a first drop port at the second optical splitter enabled to drop at least one of the STW without XPM compensation, while the WSS may be enabled to terminate the STW dropped at the first drop port.

In any of the disclosed embodiments, the ROADM may further include a third optical splitter enabled to receive the XPM compensated LTW from the first XPM and to send the XPM compensated LTW to the WSS. In the ROADM, the WSS may be enabled to switch the XPM compensated LTW to the second group in the output optical signal. The ROADM may further include a second drop port at the third optical splitter enabled to drop at least one of the XPM compensated LTW, while the WSS may be enabled to terminate the XPM compensated LTW dropped at the second drop port.

In any of the disclosed embodiments, the ROADM may further include a first add port at the WSS enabled to add at least one new STW to the first group in the output optical signal.

In any of the disclosed embodiments, the ROADM may further include a second cross-phase modulation (XPM) compensation unit comprising a second add port and an output to the WSS. In the ROADM, the second XPM compensation unit may be enabled to add at least one new LTW to the second group in the output optical signal and is enabled to XPM compensate the new LTW.

In any of the disclosed embodiments, the ROADM may further include a wavelength conversion unit enabled to shift wavelengths of at least one of the new LTW and the new STW.

In still a further aspect, an optical system for selective per-node XPM compensation is disclosed. The optical system may include an optical network having a plurality of nodes, at least some of the nodes comprising a ROADM node including a first XPM compensation unit. The optical system may further include a network controller comprising a processor and memory media accessible to the processor, the memory media storing instructions executable by the processor for receiving path information for an optical path provisioned over the optical network, the path information specifying a common begin node and first ROADM nodes included in the optical path, each of the first ROADM nodes respectively including the first XPM compensation unit. The instructions may be further executable for configuring at least one transmitter at the common begin node to assign wavelengths transmitted over the optical path and received at each of the first ROADM nodes, the wavelengths assigned by the transmitter comprising short-traveling wavelengths (STW) in a first group and long-traveling wavelengths (LTW) in a second group. In the optical system, the first group and the second group may be spectrally separated from each other in the optical signal. The instructions may still further be executable for configuring the first ROADM nodes to perform XPM compensation of the LTW in the second group using the first XPM compensation unit.

In any of the disclosed embodiments of the optical system, the instructions may further comprise instructions for configuring the first ROADM nodes to pass through at least one of the STW in the first group to an output optical signal without XPM compensation.

In any of the disclosed embodiments of the optical system, second ROADM nodes, selected from at least some of the first ROADM nodes, may further comprise a second XPM compensation unit including a first add port for receiving at least one new LTW that is added to the optical signal, while the instructions may further include instructions for configuring the second ROADM nodes to XPM compensate the new LTW received at the first add port using the second XPM compensation unit.

In any of the disclosed embodiments of the optical system, at least some of the second ROADM nodes may include a second add port enabled to receive at least one new STW that is added to the optical signal, while the instructions may further include instructions for configuring the second ROADM nodes to add the new STW to the first group in the output optical signal from the second add port without XPM compensation of the new STW.

In any of the disclosed embodiments of the optical system, at least some of the first ROADM nodes include a wavelength conversion unit enabled to shift wavelengths of at least one of the new LTW and the new STW.

In any of the disclosed embodiments of the optical system, at least some of the first ROADM nodes include a first drop port enabled to drop at least one of the STW without XPM compensation.

In any of the disclosed embodiments of the optical system, at least some of the first ROADM nodes include a second drop port enabled to drop at least one of the XPM compensated LTW.

In still a further aspect, a method for selective per-node XPM compensation of optical signals is disclosed. The method may include receiving path information for an optical path provisioned over an optical network, the path information specifying a common begin node and first reconfigurable optical add-drop multiplexer (ROADM) nodes included in the optical path, each of the first ROADM nodes respectively including a first XPM compensation unit. The method may further include configuring at least one transmitter at the common begin node to assign wavelengths transmitted over the optical path and received at each of the first ROADM nodes, the wavelengths assigned by the transmitter comprising short-traveling wavelengths (STW) in a first group and long-traveling wavelengths (LTW) in a second group. In the method, the first group and the second group may be spectrally separated from each other in the optical signal. The method may still further include configuring the first ROADM nodes to perform XPM compensation of the LTW in the second group using the first XPM compensation unit.

In any of the disclosed embodiments, the method may further include configuring the first ROADM nodes to pass through the STW in the first group to an output optical signal without XPM compensation.

In any of the disclosed embodiments of the method, second ROADM nodes, selected from at least some of the first ROADM nodes, further comprise a second XPM compensation unit including a first add port for receiving at least one new LTW that is added to the optical signal, while the method may further include configuring the second ROADM nodes to XPM compensate the new LTW received at the first add port using the second XPM compensation unit.

In any of the disclosed embodiments of the method, at least some of the second ROADM nodes include a second add port enabled to receive at least one new STW that is added to the optical signal, while the method may further include configuring the second ROADM nodes to add the new STW from the second add port to the first group in the output optical signal without XPM compensation of the new STW.

In any of the disclosed embodiments, method may include shifting wavelengths of at least one of the new LTW and the new STW using a wavelength conversion unit included with at least some of the first ROADM nodes.

In any of the disclosed embodiments, method may include dropping at least one of the STW without XPM compensation from the optical signal using a first drop port included with at least some of the first ROADM nodes.

In any of the disclosed embodiments, method may include dropping at least one of the XPM compensated LTW using a second drop port included with at least some of the first ROADM nodes.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF PARTICULAR EMBODIMENT(S)

Figure 1:
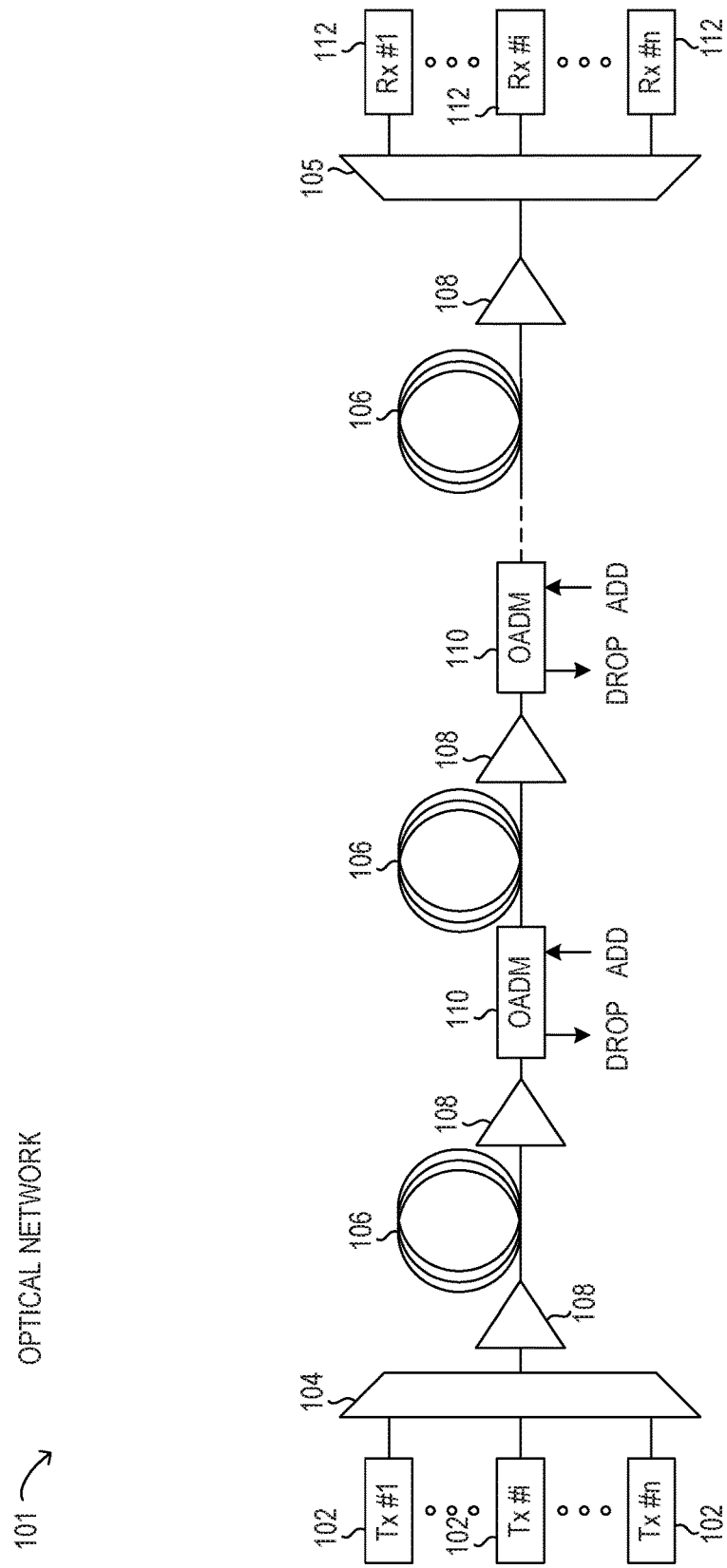
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal (also referred to herein as a "wavelength channel"). Each channel may carry a certain amount of information through optical network 101.

To increase the information capacity and transport capabilities of optical network 101, multiple signals transmitted at multiple channels may be combined into a single wide-band optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises independently modulating information onto different polarization components of an optical signal associated with a channel. In this manner, each polarization component may carry a separate signal with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

As discussed above, XPM may occur in which one wavelength of light can alter the phase of another wavelength of light, such as among the channels of a WDM optical signal. Phase modulation from one WDM channel to another WDM channel may be apparent as a power variation that occurs due to dispersion of the optical signal. Therefore, XPM compensators are known that modulate an entire optical path or optical span between two nodes. While some XPM compensation systems may be effective in improving signal quality when relatively few channels are present (less than about 15 channels), certain XPM compensation systems may actually have a negative effect on optical signal-to-noise ratio (OSNR) as the number of channels increases (greater than about 15 channels).

As will be described in further detail, methods and systems are disclosed herein for implementing a multi-channel optical XPM compensator. The multi-channel optical XPM compensator disclosed herein may enable XPM to be compensated for all channels in a multi-channel WDM optical signal, even for large numbers of channels greater than 15 channels. The multi-channel optical XPM compensator disclosed herein may provide a feed-forward XPM compensation loop with a dispersion compensation module (DCM) to simulate dispersion along an effective length of a subsequent fiber optic span. The multi-channel optical XPM compensator disclosed herein may further be used in configurations that enable simultaneous XPM compensation for all WDM channels, without having to introduce a delay in the propagation of individual WDM channels. The multi-channel optical XPM compensator disclosed herein may be implemented using various spectral overlap schemes to optimize XPM compensation.

In operation of optical network 101, for example, ROADM nodes included in optical network 101 may be equipped with the multi-channel optical XPM compensator disclosed herein.

Figure 2A:
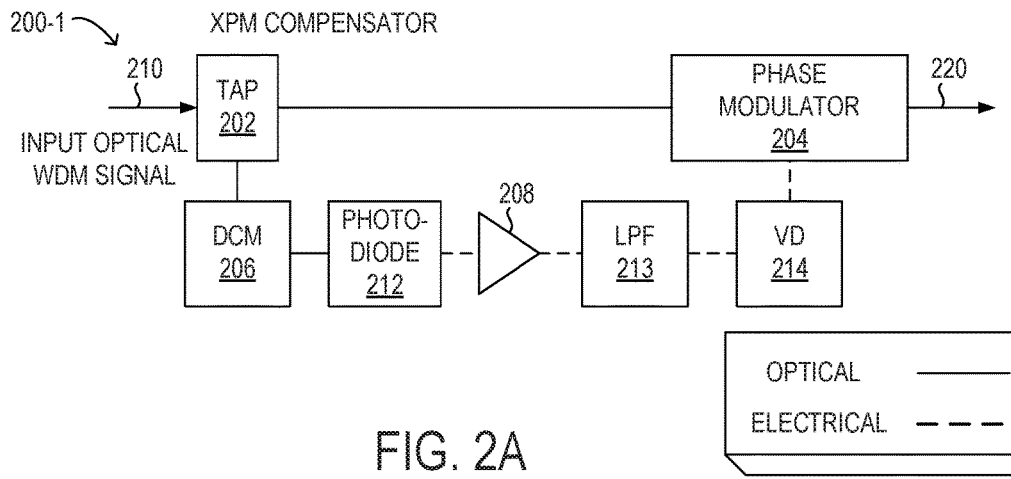
FIGS. 2A, 2B, and 2C are block diagrams of selected elements of example embodiments of an XPM compensator.

Referring now to FIG. 2A, a block diagram of selected elements of an example embodiment of an XPM compensator 200-1 is depicted. In FIG. 2A, XPM compensator 200-1 is shown in a schematic representation and is not drawn to scale. It is noted that, in different embodiments, XPM compensator 200-1 may be operated with additional or fewer elements.

In FIG. 2A, XPM compensator 200-1 includes a feed-forward control loop that extends from optical tap 202 to phase modulator 204, which are placed along a WDM optical path having input WDM optical signal 210 and output WDM optical signal 220. It is noted that different arrangements of components in the feed-forward loop in both the optical and the electrical domain may be implemented in different embodiments. At optical tap 202 (also referred to as an optical splitter), a portion of input WDM optical signal 210 is diverted to the feed-forward control loop. Specifically, DCM 206 receives the optical signal from optical tap 202 and is enabled to add a certain amount of dispersion into the feed-forward control loop in order to enable XPM compensation of the optical signal in an effective length of the optical fiber subsequent to XPM compensator 200-1. Because chromatic dispersion (CD) results in pulse spreading and inter-symbol interference (ISI), the addition of dispersion at DCM 206 may result in improved XPM compensation in the feed-forward loop by simulating XPM that is caused by a power variation of the optical signal along the effective length. Specifically, the dispersion may correspond to a calculated fraction of the effective length, where the fraction is between 0 and 1. After DCM 206, photodiode 212 (or another type of photosensor) receives the optical signal in the feed-forward loop and generates a corresponding electrical signal. As shown in XPM compensator 200-1, an RF amplifier 208 may then amplify the electrical signal received from photodiode 212. Then, a low pass filter (LPF) 213 may be applied to the electrical signal output by RF amplifier 208. After LPF 213, a variable delay 214 applies a time delay to compensate for path length variations before outputting the electrical signal to phase modulator 204. In the exemplary configuration of FIG. 2A, the optical path between tap 202 and phase modulator 204 is assumed to be long enough such that variable delay 214 is capable of tuning or matching the delay between the optical signal arriving at phase modulator 214 and the feed-forward signal at variable delay 214. Phase modulator 204 may operate to modulate the phase of WDM input optical signal 210, based on a received portion of WDM input optical signal 210 from optical tap 202, to generate output WDM optical signal 220, which is XPM compensated.

Figure 2B:
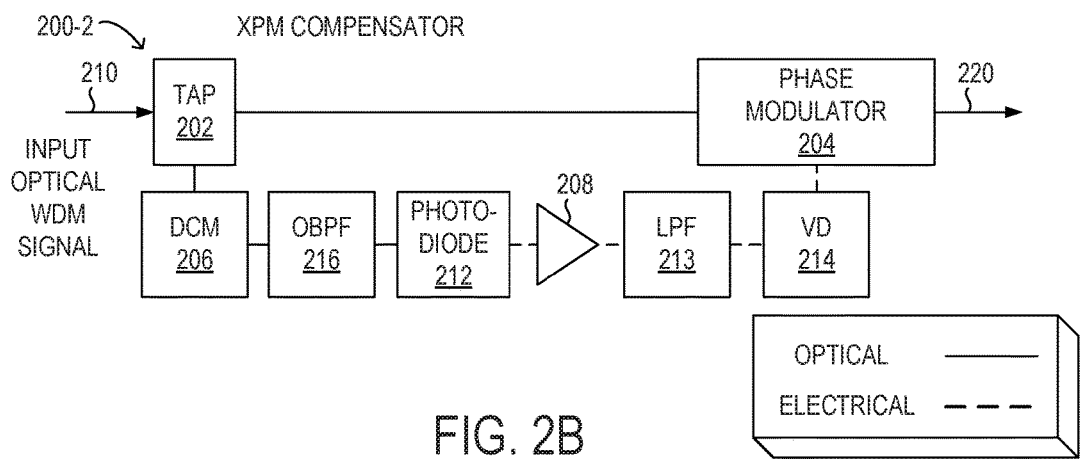

Referring now to FIG. 2B, a block diagram of selected elements of an example embodiment of an XPM compensator 200-2 is depicted. In FIG. 2B, XPM compensator 200-2 is shown in a schematic representation and is not drawn to scale. It is noted that, in different embodiments, XPM compensator 200-2 may be operated with additional or fewer elements.

In FIG. 2B, XPM compensator 200-2 includes all the same elements depicted with regard to XPM compensator 200-1 in FIG. 2A. Additionally, XPM compensator 200-2 includes an optical bandpass filter (OBPF) 216, which may be used to select an optical band from input WDM optical signal 210, such as an optical band including a discrete number of optical channels. When OBPF 216 is used to isolate center wavelength (non-edge wavelength) channels, some improvement in XPM for center wavelength channels may be observed. However, because OBPF 216 uses a more narrowband for the feed-forward loop than input WDM optical signal 210, XPM compensation for edge wavelength channels may suffer, because signal intensity from neighboring channels outside the bandpass of OBPF 216 is not detected for feed-forward compensation and does not contribute to XPM compensation in XPM compensator 200-2.

Figure 2C:
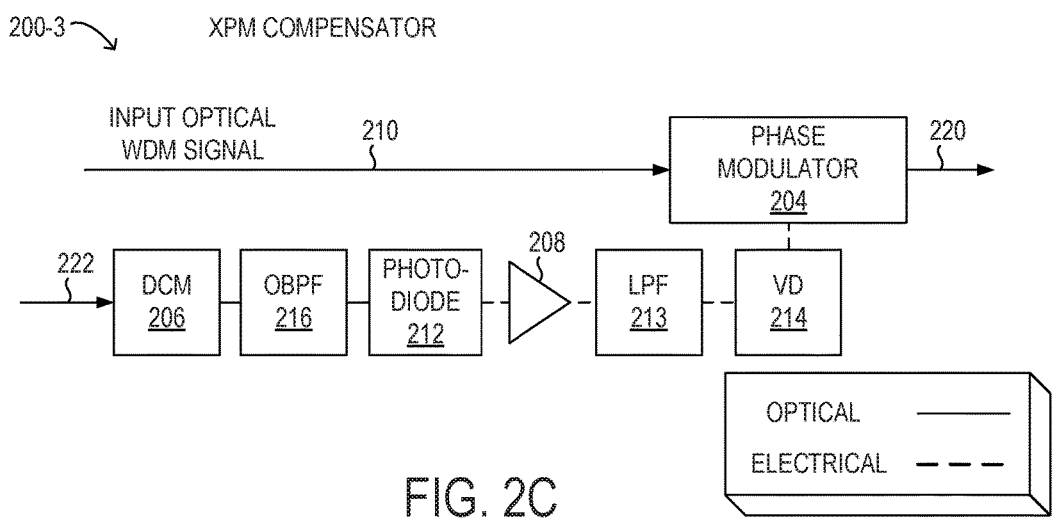

Referring now to FIG. 2C, a block diagram of selected elements of an example embodiment of an XPM compensator 200-3 is depicted. In FIG. 2C, XPM compensator 200-3 is shown in a schematic representation and is not drawn to scale. It is noted that, in different embodiments, XPM compensator 200-3 may be operated with additional or fewer elements.

In FIG. 2C, XPM compensator 200-3 includes a feed-forward control loop that receives an external input 222 and does not rely on an optical tap 202 from input WDM optical signal 210. In this manner, XPM compensator 200-3 may be integrated into various ROADM environments that use a WSS (see also FIG. 6). After receiving external input 222, the feed-forward loop in XPM compensator 200-3 may include the same elements as described above with respect to XPM compensator 200-2 in FIG. 2B.

Figure 3:
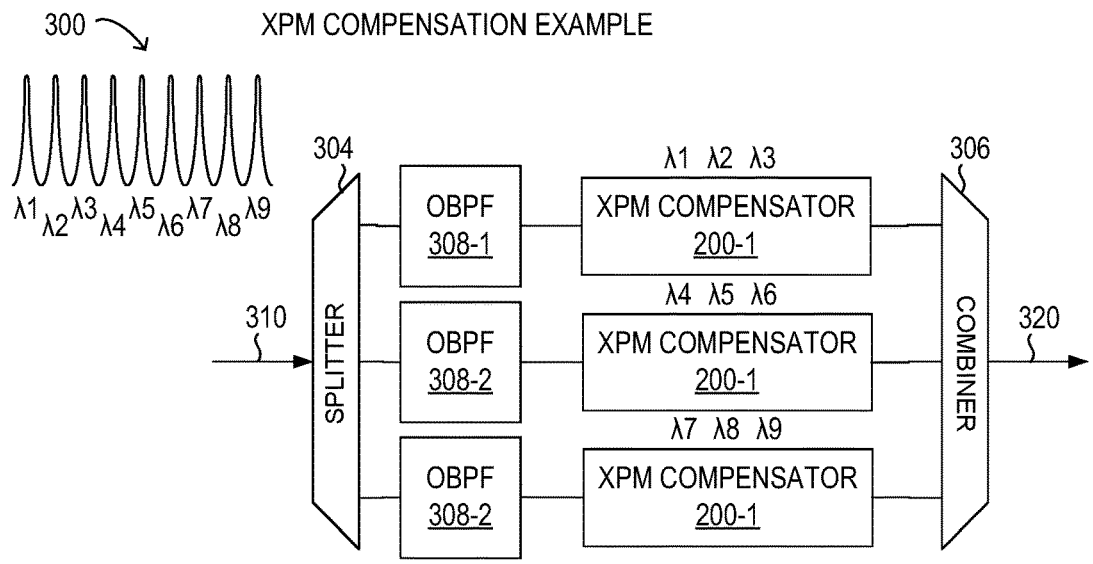
FIG. 3 is a block diagram of selected elements of an embodiment of an XPM compensation example.

Referring now to FIG. 3, selected elements of an embodiment of an XPM compensation example 300 are depicted. FIG. 3, XPM compensation example 300 is shown in a schematic representation and is not drawn to scale. It is noted that, in different embodiments, XPM compensation example 300 may include additional or fewer elements.

In XPM compensation example 300 shown in FIG. 3, it is assumed that an input WDM optical signal 310 consists of nine wavelength channels, shown successively as $\lambda 1$ through $\lambda 9$. It is noted that in various embodiments, different numbers of channels may be included in input WDM optical signal 310 and different numbers of XPM compensators 200 may be used in a variety of different spectral allocation schemes, as desired. XPM compensation example 300 illustrates a spectral allocation scheme in which three instances of XPM compensator 200-1 are used in parallel to compensate XPM on subbands of input WDM optical signal 310. At splitter 304, input WDM optical signal 310 may be split into three separate fibers to OBPF 308-1, 308-2, 308-3 in parallel. Each OBPF 308 may be programmed to pass a certain subband of input WDM optical signal 310. In the example embodiment shown in FIG. 3, each OBPF 308 passes a subband including 3 wavelength channels. Accordingly, OBPF 308-1 passes wavelengths $\lambda 1$, $\lambda 2$, $\lambda 3$; OBPF 308-2 passes wavelengths $\lambda 4$, $\lambda 5$, $\lambda 6$; and OBPF 308-3 passes wavelengths $\lambda 7$, $\lambda 8$, $\lambda 9$. At combiner 306, the XPM compensated subbands are combined to form output WDM optical signal 320.

Figure 4:
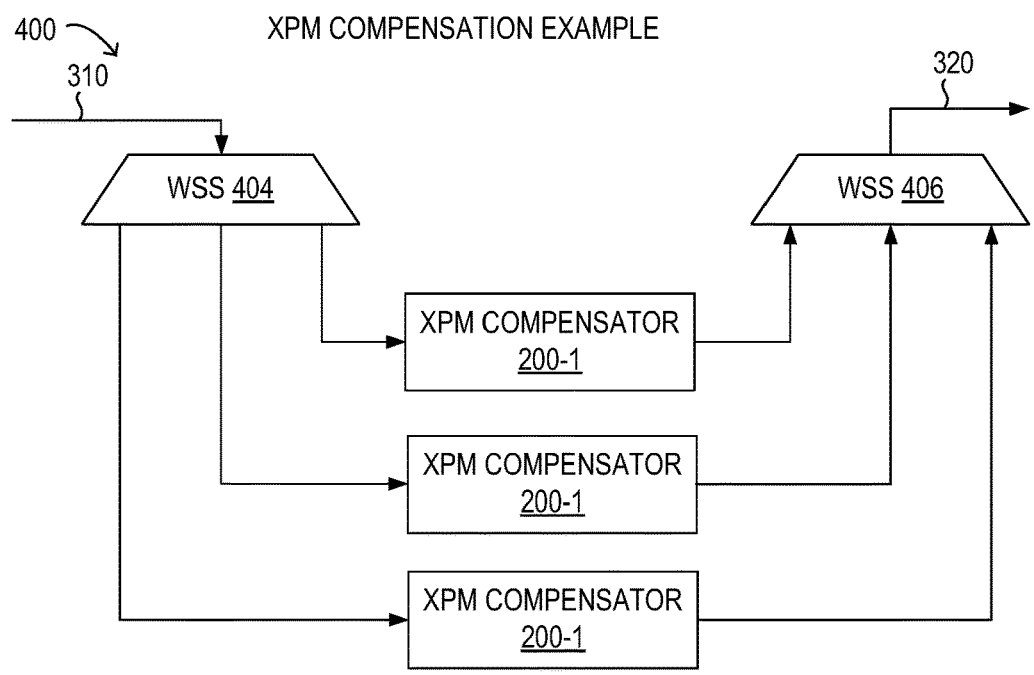
FIG. 4 is a block diagram of selected elements of an embodiment of an XPM compensation example.

Referring now to FIG. 4, selected elements of an embodiment of an XPM compensation example 400 are depicted. FIG. 4, XPM compensation example 400 is shown in a schematic representation and is not drawn to scale. It is noted that, in different embodiments, XPM compensation example 400 may include additional or fewer elements.

In XPM compensation example 400 shown in FIG. 4, an arrangement using WSS 404, 406 instead of splitter 304 and combiner 306 from FIG. 3 is shown. In comparison to splitter 304 and combiner 306, the use of two WSS provides the ability to select individual channels to add and drop from a subband. In one exemplary embodiment, the same spectral allocation scheme described above with respect to FIG. 3 may be implemented using XPM compensation example 400, in which WSS 404 passes each subband in parallel from input WDM optical signal 310 to a respective XPM compensator 200-1, while WSS 406 is used to recombine the subbands into output WDM optical signal 320, which is XPM compensated. It is noted that in various embodiments, different numbers of channels may be included in input WDM optical signal 310 and different numbers of XPM compensators 200 may be used in a variety of different spectral allocation schemes, as desired.

It is further noted that XPM compensation example 400 in FIG. 4 may be used to implement various different spectral allocation schemes, such as described below with respect to FIG. 5.

Figure 5:
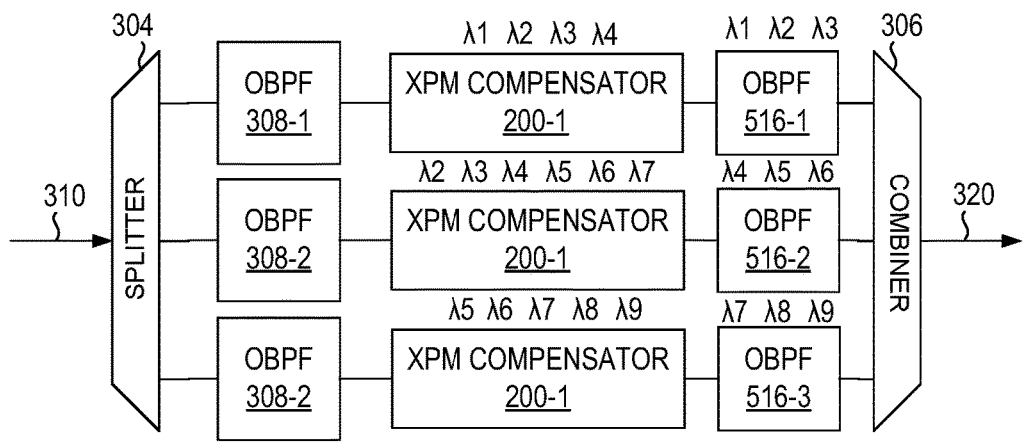
FIG. 5 is a block diagram of selected elements of an embodiment of an XPM compensation example.

Referring now to FIG. 5, selected elements of an embodiment of an XPM compensation example 500 are depicted. FIG. 5, XPM compensation example 500 is shown in a schematic representation and is not drawn to scale. It is noted that, in different embodiments, XPM compensation example 500 may include additional or fewer elements.

In XPM compensation example 500 shown in FIG. 5, it is assumed that an input WDM optical signal 310 consists of nine wavelength channels, as shown in FIG. 3. It is noted that in various embodiments, different numbers of channels may be included in input WDM optical signal 310 and different numbers of XPM compensators 200 may be used in a variety of different spectral allocation schemes, as desired. XPM compensation example 500 illustrates a spectral allocation scheme in which three instances of XPM compensator 200-1 are used in parallel to compensate XPM on subbands of input WDM optical signal 310. At splitter 304, input WDM optical signal 310 may be split into three separate fibers to OBPF 308-1, 308-2, 308-3 in parallel. Each OBPF 308 may be programmed to pass a certain subband of input WDM optical signal 310. In the example embodiment shown in FIG. 5, each OBPF 308 passes a subband including a different number of wavelength channels. As shown, OBPF 308-1 passes wavelengths $\lambda 1, \lambda 2, \lambda 3, \lambda 4$; OBPF 308-2 passes wavelengths $\lambda 2, \lambda 3, \lambda 4, \lambda 5, \lambda 6, \lambda 7$; and OBPF 308-3 passes wavelengths $\lambda 5, \lambda 6, \lambda 7, \lambda 8, \lambda 9$. Then, in XPM compensation example 500, a second OBPF 516 is used to remove the overlapped wavelength channels. Accordingly, OBPF 516-1 passes wavelengths $\lambda 1, \lambda 2, \lambda 3$; OBPF 516-2 passes wavelengths $\lambda 4, \lambda 5, \lambda 6$; and OBPF 516-3 passes wavelengths $\lambda 7, \lambda 8, \lambda 9$. The use of overlapped spectra in XPM compensation example 500 may improve XPM compensation in the respective feed-forward loops of XPM compensator 200-1, while channels with poorer XPM compensation may be dropped. It is noted that gain equalization (not shown) may be applied in XPM compensation example 500 after OBPF 516, depending on the actual spectrum overlap scheme used. Then, the XPM compensated subbands are combined at combiner 306 to form output WDM optical signal 320.

It is noted that the spectral allocation described above may be implemented using XPM compensation example 400 shown in FIG. 4. For example, first WSS 404 may switch the spectral subbands of wavelength channels to respective XPM compensator 200-1, while second WSS 406 may drop the overlapped wavelength channels.

Figure 6:
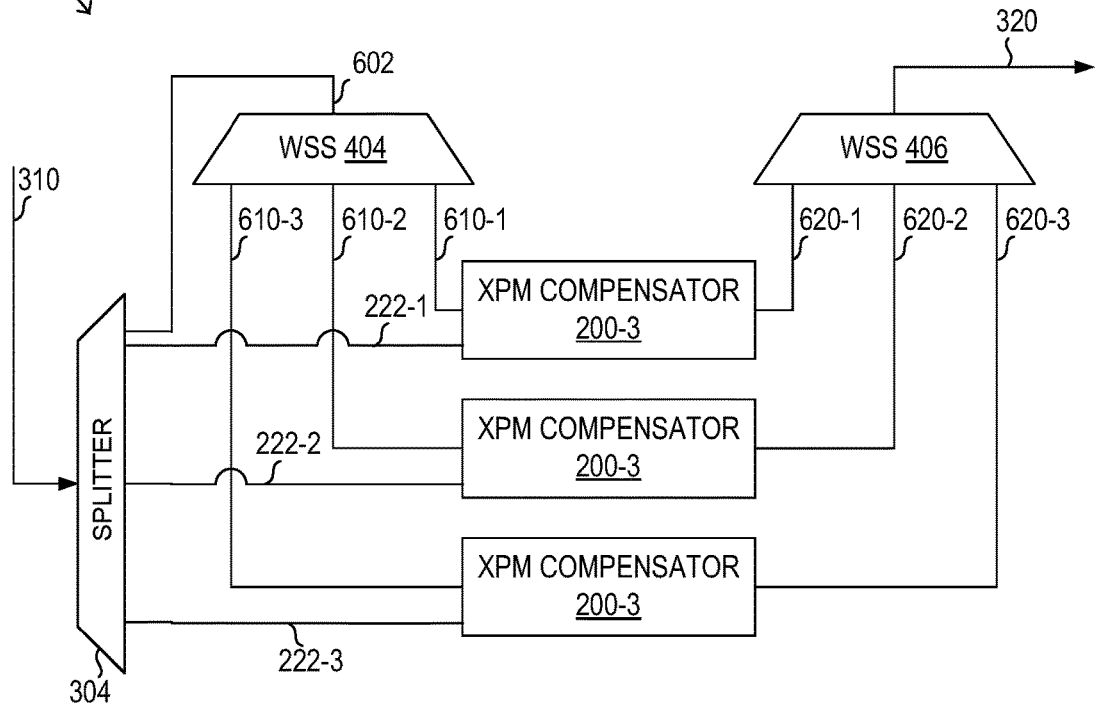
FIG. 6 is a block diagram of selected elements of an embodiment of an XPM compensation example.

Referring now to FIG. 6, selected elements of an embodiment of an XPM compensation example 600 are depicted. FIG. 6, XPM compensation example 600 is shown in a schematic representation and is not drawn to scale. It is noted that, in different embodiments, XPM compensation example 600 may include additional or fewer elements.

In XPM compensation example 600 shown in FIG. 6, it is assumed that an input WDM optical signal 310 consists of nine wavelength channels, as shown in FIG. 3. It is noted that in various embodiments, different numbers of channels may be included in input WDM optical signal 310 and different numbers of XPM compensators 200 may be used in a variety of different spectral allocation schemes, as desired. XPM compensation example 600 illustrates a spectral allocation scheme in which three instances of XPM compensator 200-3 are used in parallel to compensate XPM on subbands of input WDM optical signal 310. At splitter 304, input WDM optical signal 310 may be split into four separate fibers in parallel: one fiber may be used as an input degree 602 for WSS 404, while the other three fibers may be used as external inputs 222 for each respective XPM compensator 200-3. Each OBPF 216 in XPM compensator 200-3 (see FIG. 2C) may be programmed to pass a certain subband of external input 222, which carries input WDM optical signal 310. In the example embodiment shown in FIG. 6, output degree 610-1 from WSS 404 may pass wavelengths $\lambda 1, \lambda 2, \lambda 3$; output degree 610-2 from WSS 404 may pass wavelengths $\lambda 4, \lambda 5, \lambda 6$; and output degree 610-3 from WSS 404 may pass wavelengths $\lambda 7, \lambda 8, \lambda 9$. Concurrently, each external input signal 222 may be subject to OBPF 216 in respective XPM compensator 200-3, such that external input signal 222-1 is spectrally narrowed to a passed subband having wavelengths $\lambda 1, \lambda 2, \lambda 3, \lambda 4$; external input signal 222-2 is spectrally narrowed to a passed subband having wavelengths $\lambda 2, \lambda 3, \lambda 4, \lambda 5, \lambda 6, \lambda 7$; and external input signal 222-2 is spectrally narrowed to a passed subband having wavelengths $\lambda 5, \lambda 6, \lambda 7, \lambda 8, \lambda 9$. It is noted that in some embodiments, external input signal 222-2 may be narrowed using an OBPF that is external to XPM compensator 200-3. Then, XPM compensated subband 620-1 includes wavelengths $\lambda 1, \lambda 2, \lambda 3$; XPM compensated subband 620-2 includes wavelengths $\lambda 4, \lambda 5, \lambda 6$; and XPM compensated subband 620-3 includes wavelengths $\lambda 7, \lambda 8, \lambda 9$. The use of overlapped spectra in XPM compensation example 600 may improve XPM compensation in the respective feed-forward loops of XPM compensator 200-3, while channels with poorer XPM compensation may be dropped. It is noted that gain equalization (not shown) may be applied in XPM compensation example 600, depending on the actual spectrum overlap scheme used. Then, the XPM compensated subbands 620 are combined at WSS 406 to form output WDM optical signal 320.

Figure 7A:
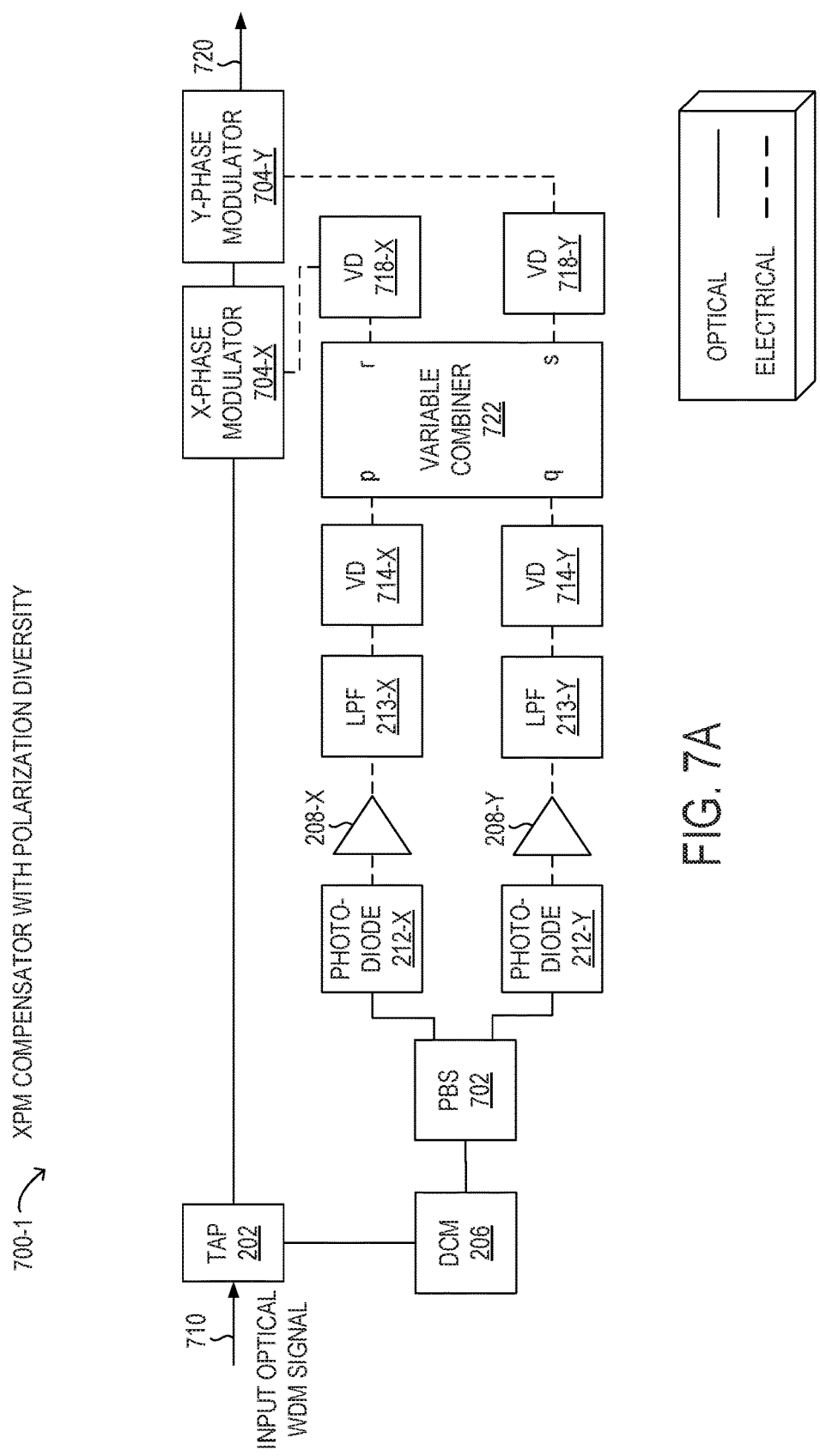
FIGS. 7A, 7B, 7C, and 7D are block diagrams of selected elements of example embodiments of an XPM compensator with polarization diversity.

Referring now to FIG. 7A, a block diagram of selected elements of an example embodiment of an XPM compensator 700-1 with polarization diversity is depicted. In FIG. 7A, XPM compensator 700-1 is shown in a schematic representation and is not drawn to scale. It is noted that, in different embodiments, XPM compensator 700-1 may be operated with additional or fewer elements.

In FIG. 7A, it is assumed that input WDM optical signal 710 has polarization diversity, such that an X-polarized component and a Y-polarized component of the optical signal are present. XPM compensator 700-1 includes a feed-forward control loop that extends from optical tap 202 to phase modulators 704, which are placed along a WDM optical path having input WDM optical signal 710 and output WDM optical signal 720. At optical tap 202 (also referred to as an optical splitter), a portion of input WDM optical signal 710 is diverted to the feed-forward control loop. Specifically, DCM 206 receives the optical signal from optical tap 202 and is enabled to add a certain amount of dispersion into the feed-forward control loop, as described above with respect to FIG. 2A. After DCM 206, a polarization beam splitter (PBS) 702 further splits the optical signal into the X-polarized component and the Y-polarized component. The X-polarized component is fed from PBS 702 to photodiode 212-X, which generates an electrical signal that is amplified by RF amplifier 208-X and filtered using LPF 213-X. The Y-polarized component is fed from PBS 702 to photodiode 212-Y, which generates an electrical signal that is amplified by RF amplifier 208-Y and filtered using LPF 213-Y. Then, an variable combiner 722 may be applied to the electrical signals from LPF 213-X, 213-Y, using inputs p, q and output r, s, such that: $r=h_{11}p+h_{12}q$, $s=h_{21}p+h_{22}q$, where h is a weighting factor. In one example, $h_{11}=h_{12}=h_{21}=h_{22}=0.5$, although different values may be used in different embodiments. Furthermore, variable delays 714-X and 718-X are used before and after variable combiner 722 for the X-polarized component signal, while variable delays 714-Y and 718-Y are used before and after variable combiner 722 for the Y-polarized component signal. Then, variable delay 718-X outputs a control signal for the X-polarized component to X-phase modulator 704-X, while variable delay 718-Y outputs a control signal for the Y-polarized component to Y-phase modulator 704-Y, to generate output WDM optical signal 720, which is XPM compensated with polarization diversity.

Figure 7B:
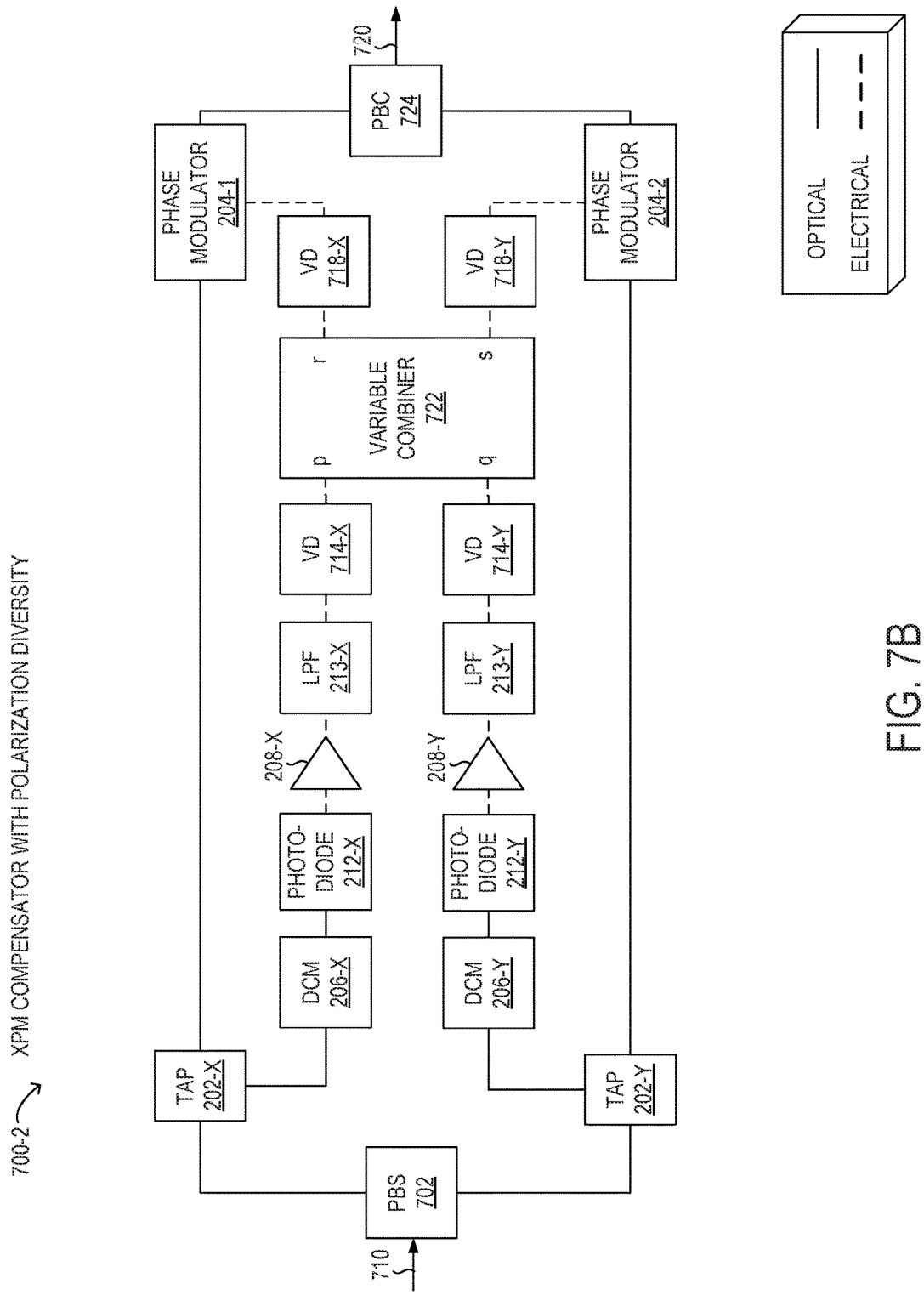

Referring now to FIG. 7B, a block diagram of selected elements of an example embodiment of an XPM compensator 700-2 with polarization diversity is depicted. In FIG. 7B, XPM compensator 700-2 is shown in a schematic representation and is not drawn to scale. It is noted that, in different embodiments, XPM compensator 700-2 may be operated with additional or fewer elements.

In FIG. 7B, it is assumed that input WDM optical signal 710 has polarization diversity, such that an X-polarized component and a Y-polarized component of the optical signal are present. XPM compensator 700-2 includes a feed-forward control loop that extends from optical tap 202 to phase modulators 204, which are placed along a WDM optical path having input WDM optical signal 710 and output WDM optical signal 720. Input WDM optical signal 710 is received at PBS 702, which separates the X-polarized component and the Y-polarized component along different optical fibers. At optical tap 202-X, a portion of the X-polarized component is diverted to an X-polarization feed-forward control loop, while at optical tap 202-Y, a portion of the Y-polarized component is diverted to a Y-polarization feed-forward control loop. Specifically, in the X-polarization feed forward control loop, DCM 206-X receives the optical signal from optical tap 202-X and is enabled to add a certain amount of dispersion into the X feed-forward control loop, as described above with respect to FIG. 2A, while in the Y-polarization feed forward control loop, DCM 206-Y receives the optical signal from optical tap 202-Y and is enabled to add a certain amount of dispersion into the Y feed-forward control loop. After DCM 206-X, the X-polarized component is fed to photodiode 212-X, which generates an electrical signal that is amplified by RF amplifier 208-X and filtered using LPF 213-X. After DCM 206-Y, the Y-polarized component is fed to photodiode 212-Y, which generates an electrical signal that is amplified by RF amplifier 208-Y and filtered using LPF 213-Y. Then, variable combiner 722 may be applied to the electrical signals from LPF 213-X, 213-Y, as described above with respect to FIG. 7A, including variable delays 714-X and 718-X that are used before and after variable combiner 722 for the X-polarized component signal, and variable delays 714-Y and 718-Y that are used before and after variable combiner 722 for the Y-polarized component signal. Then, variable delay 718-X outputs a control signal for the X-polarized component to a first phase modulator 204-1, while variable delay 718-Y outputs a control signal for the Y-polarized component to a second phase modulator 204-2. The output signals from phase modulators 204 are combined at polarization beam combiner 724 to generate output WDM optical signal 720, which is XPM compensated with polarization diversity.

Figure 7C:
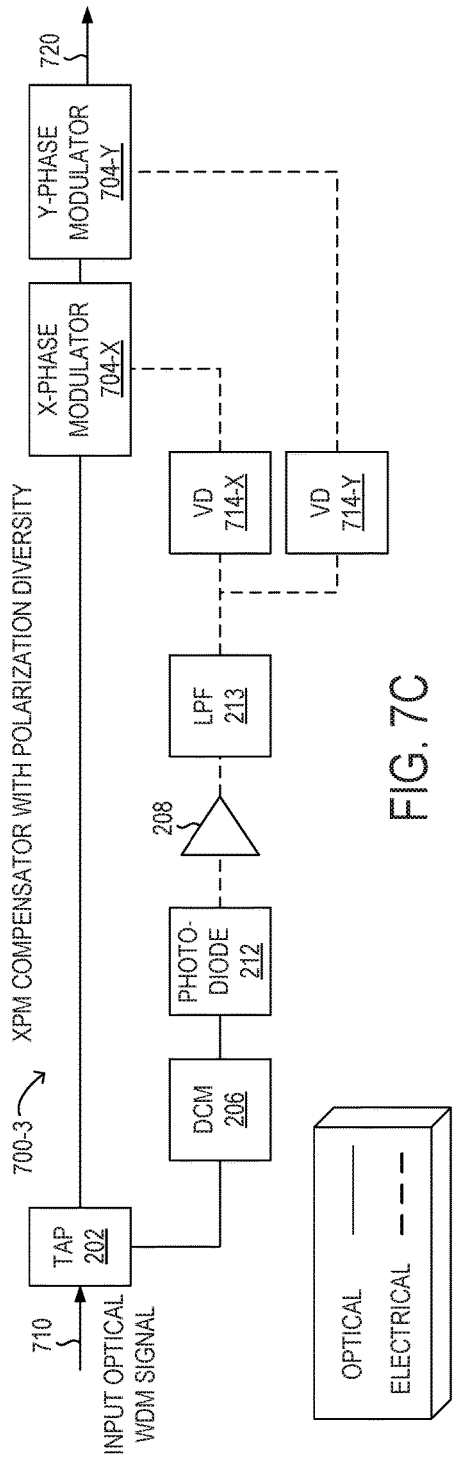

Referring now to FIG. 7C, a block diagram of selected elements of an example embodiment of an XPM compensator 700-3 with polarization diversity is depicted. In FIG. 7C, XPM compensator 700-3 is shown in a schematic representation and is not drawn to scale. It is noted that, in different embodiments, XPM compensator 700-3 may be operated with additional or fewer elements.

In FIG. 7C, it is assumed that input WDM optical signal 710 has polarization diversity, such that an X-polarized component and a Y-polarized component of the optical signal are present. XPM compensator 700-3 includes a feed-forward control loop that extends from optical tap 202 to phase modulators 704, which are placed along a WDM optical path having input WDM optical signal 710 and output WDM optical signal 720. At optical tap 202, a portion of input WDM optical signal 710 is diverted to the feed-forward control loop. Specifically, DCM 206 receives the optical signal from optical tap 202 and is enabled to add a certain amount of dispersion into the feed-forward control loop, as described above with respect to FIG. 2A. Photodiode 212, RF amplifier 208, and LPF 213 operate in a substantially similar manner as described with respect to FIG. 2A. After LPF 213, the electrical signal is fed to variable delay 714-X and variable delay 714-Y in order to adjust for the X-polarized component and the Y-polarized component. The arrangement shown in FIG. 7C may be substantially equivalent to the use of an variable combiner with $h_{11}=h_{12}=h_{21}=h_{22}=0.5$, as shown in FIG. 7A. Then, variable delay 714-X outputs a control signal for the X-polarized component to X-phase modulator 704-X, while variable delay 714-Y outputs a control signal for the Y-polarized component to Y-phase modulator 704-Y, to generate output WDM optical signal 720, which is XPM compensated with polarization diversity.

Figure 7D:
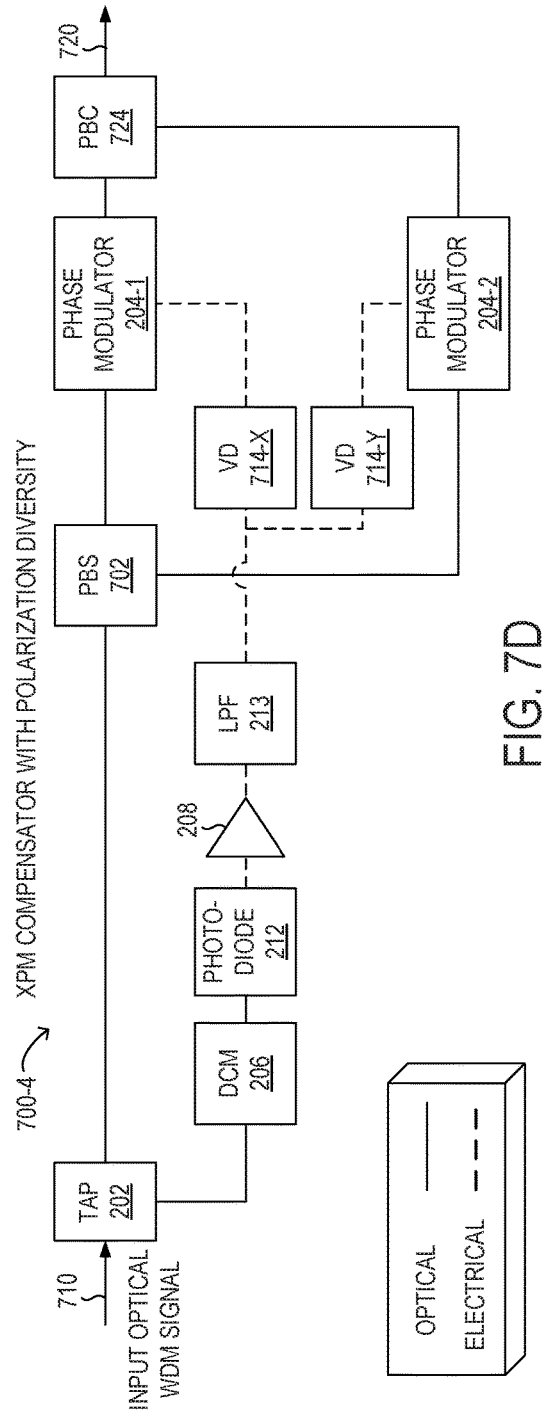

Referring now to FIG. 7D, a block diagram of selected elements of an example embodiment of an XPM compensator 700-4 with polarization diversity is depicted. In FIG. 7D, XPM compensator 700-4 is shown in a schematic representation and is not drawn to scale. It is noted that, in different embodiments, XPM compensator 700-4 may be operated with additional or fewer elements.

In FIG. 7D, it is assumed that input WDM optical signal 710 has polarization diversity, such that an X-polarized component and a Y-polarized component of the optical signal are present. XPM compensator 700-4 includes a feed-forward control loop that extends from optical tap 202 to phase modulators 204, which are placed along a WDM optical path having input WDM optical signal 710 and output WDM optical signal 720. At optical tap 202, a portion of input WDM optical signal 710 is diverted to the feed-forward control loop, while the remaining portion is diverted to PBS 702. Specifically, DCM 206 receives the optical signal from optical tap 202 and is enabled to add a certain amount of dispersion into the feed-forward control loop, as described above with respect to FIG. 2A. Photodiode 212, RF amplifier 208, and LPF 213 operate in a substantially similar manner as described with respect to FIG. 2A. After LPF 213, the electrical signal is fed to variable delay 714-X and variable delay 714-Y in order to adjust for the X-polarized component and the Y-polarized component. The arrangement shown in FIG. 7D may be substantially equivalent to the use of an variable combiner with $h_{11}=h_{12}=h_{21}=h_{22}=0.5$, as shown in FIG. 7A. Then, variable delay 714-X outputs a control signal for the X-polarized component to a first phase modulator 204-1, while variable delay 714-Y outputs a control signal for the Y-polarized component to a second phase modulator 204-2. The first phase modulator 204-1 receives the X-polarized component from PBS 702, while the second phase modulator 204-2 receives the Y-polarized component from PBS 702. The outputs from the first and second phase modulators 204, corresponding to the X-polarized component and the Y-polarized component, are combined at PBC 724 to generate output WDM optical signal 720, which is XPM compensated with polarization diversity.

Figure 8:
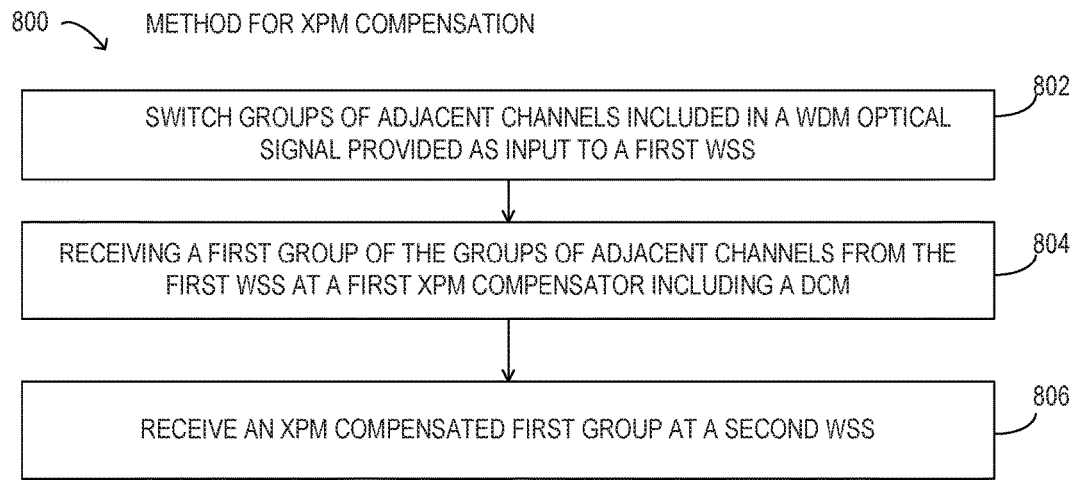
FIG. 8 is a flow chart of selected elements of a method for XPM compensation.

Referring now to FIG. 8, a flowchart of selected elements of an embodiment of a method 800 for XPM compensation, as described herein, is depicted. In various embodiments, method 800 may be performed using XPM compensators 200, 700 in a ROADM node in an optical network, for example, corresponding to XPM compensation examples 400, 600. It is noted that certain operations described in method 800 may be optional or may be rearranged in different embodiments.

Method 800 may begin at step 802 by switching groups of adjacent channels included in a WDM optical signal provided as input to a first WSS. At step 804, a first group of the groups of adjacent channels is received from the first WSS at a first XPM compensator including a DCM. At step 806, an XPM compensated first group is received at a second WSS.

Figure 9:
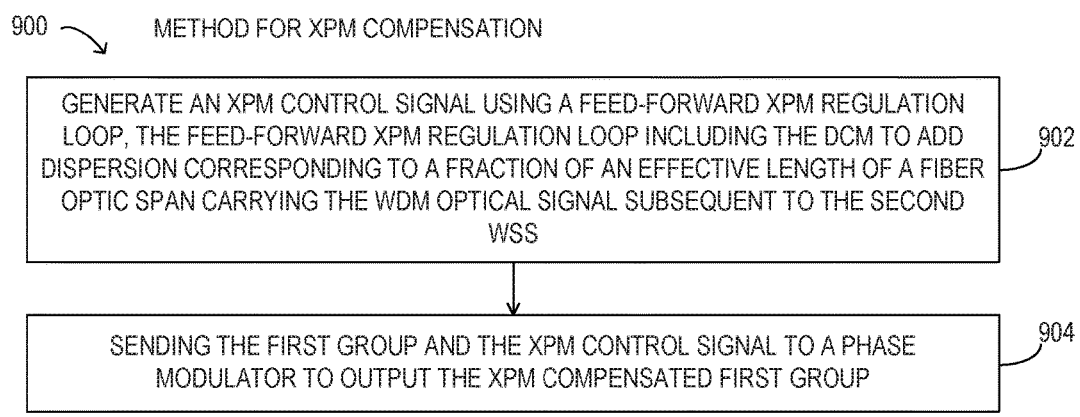
FIG. 9 is a flow chart of selected elements of a method for XPM compensation.

Referring now to FIG. 9, a flowchart of selected elements of an embodiment of method 900 for XPM compensation, as described herein, is depicted. In various embodiments, method 900 may be performed by XPM compensators 200, 700 in a ROADM node in an optical network, for example, in XPM compensation examples 400, 600. It is noted that certain operations described in method 900 may be optional or may be rearranged in different embodiments.

Method 900 may begin at step 902 by generating an XPM control signal using a feed-forward XPM regulation loop, the feed-forward XPM regulation loop including the DCM to add dispersion corresponding to a fraction of an effective length of a fiber optic span carrying the WDM optical signal subsequent to the second WSS. At step 902, the first group and the XPM control signal are sent to a phase modulator to output the XPM compensated first group.

As disclosed herein, method and system for multi-channel optical XPM compensation may include a DCM to improve performance of a feed-forward control loop in an optical path in an optical network. Additionally, various spectral overlap schemes may be used with multi-channel WDM optical signals using XPM compensators in parallel, such as at a ROADM node. Polarization diversity may also be supported for XPM compensation including a DCM.

Network Management with Per-Node Cross-Phase-Modulation (XPM) Compensation: Selective (XPM) Compensation Various aspects of optical XPM compensation have been described in detail with regard to FIGS. 1 through 9. In FIGS. 10 through 16, network management with per node XPM compensation is described using selective XPM compensation for certain wavelengths.

In an additional aspect, selective XPM compensation for optical signals may also be performed. The selective XPM compensation may be performed when at least two groups of wavelengths for transmission to different destinations are present at a common begin node of their respective optical paths. Each group of wavelengths may be selected based on the distance of the optical path from the common begin node to their respective destination nodes. For example, the optical path length is calculated between the common begin node and a destination node for each wavelength. Because of different network topologies, such as linear, ring, mesh, etc., that may interconnect and may be used to route different wavelengths to different destinations, certain wavelengths in the optical signal may propagate over the optical network over different distances.

Specifically, the wavelengths may be grouped into short traveling wavelengths (STW) and long traveling wavelengths (LTW) based on the optical path length for each respective group. At the transmitter of the common begin node, a certain threshold for the optical path length may be used to distinguish between the STW and the LTW, such as 10 km, 50 km, 100 km, 150 km, 200 km, or 250 km in various embodiments. In some embodiments, the threshold path distance used to distinguish between the STW and the LTW may be determined, at least in part, based on XPM characteristics of the optical signal being carried by each wavelength. In particular embodiments, transmitter 102 at the common begin node may receive path information for each wavelength from a path computation engine (PCE) of a network controller (see also FIG. 17). The path information may include a length of the optical path from the common begin node for each respective wavelength. Then, based on the optical path length and the threshold used, each wavelength may be assigned as LTW or STW at the common begin node.

Additionally, after grouping the wavelengths at the common begin node into STW and LTW, the groups of wavelengths may be spectrally spaced apart by transmitter 102 in order to facilitate splitting off STW and LTW at any subsequent node along the optical path. In other words, a guardband may be applied between the STW group and the LTW group to spectrally space the groups apart from one another. The spectral spacing may be selected to be at least one wavelength slot wide, and may be several wavelength slots wide. In some implementations, a certain optical bandwidth may be allocated for transmission of the groups of wavelengths (both the STW and the LTW) at transmitter 102 of the common begin node, such that the STW group is assigned to one end of the optical bandwidth, while the LTW is assigned to another end of the optical bandwidth, with the resulting guardband between the STW group and the LTW group being defined by the remaining bandwidth left over after all wavelengths have been assigned to their respective wavelength slots. Various other methods for grouping apart the STW and the LTW are contemplated.

After being launched from the common begin node, the STW and the LTW may propagate together for at least an initial portion of their respective optical paths, with the spectral separation between the STW group and the LTW group. Then, the STW and the LTW may be transmitted to certain nodes having a ROADM, where wavelength specific switching and routing may be performed. At the ROADM nodes, the ROADM may be enabled for selective XPM compensation, as described herein. Specifically, XPM compensation may be performed for LTW and may be omitted for STW at the ROADM nodes transmitting the STW and the LTW. The selective application of XPM compensation may be justified due to a small impact of XPM on the STW, as compared with a greater impact of XPM on the LTW. By reducing the number of wavelengths that are subject to XPM compensation, as described herein, the resources involved with XPM compensation at each node may be reduced, as compared to applying XPM compensation to all wavelengths, which is economically advantageous. For example, certain ROADM nodes enabled for selective XPM compensation may be equipped with fewer WSS ports and fewer numbers of optical band pass filters (OPBF), which may reduce equipment costs at such nodes, without incurring a substantial adverse effect on the transmission of the optical signals.

Figure 10:
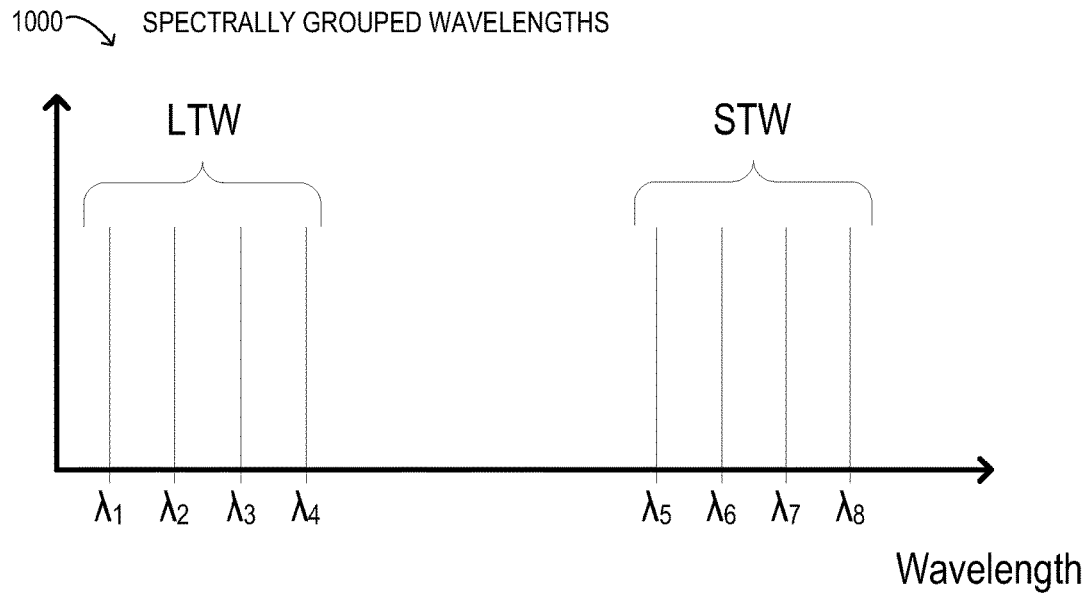
FIG. 10 is a spectrum of spectrally grouped wavelengths.

FIG. 10 shows a spectrum 1000 of spectrally grouped wavelengths in an optical signal that have been grouped into LTW and STW. Specifically, in spectrum 1000, wavelengths $\lambda_1$, $\lambda_2$, $\lambda_3$, and $\lambda_4$ are shown grouped together as LTW on one side of the spectrum, while wavelengths $\lambda_5$, $\lambda_6$, $\lambda_7$, and $\lambda_8$ are shown grouped together as STW on another side of the spectrum. A spectral gap, or guardband, is shown in FIG. 10 as an empty region between $\lambda_4$ and $\lambda_5$ and may facilitate the splitting off of the LTW and the STW as individual groups of wavelengths by using optical filtering or optical demultiplexing at the ROADM node. The grouping shown in spectrum 1000 may be performed when the optical signal is transmitted from the common begin node, such as by controlling transmitters 102 (see FIG. 1) for each individual wavelength, and by using a PCE for path length determination, as described above. Although the STW and the LTW are shown grouped with 4 wavelengths each for descriptive purposes in FIG. 10, it will be understood that in different embodiments, different numbers of the STW and the LTW may be respectively grouped together.

Figure 11:
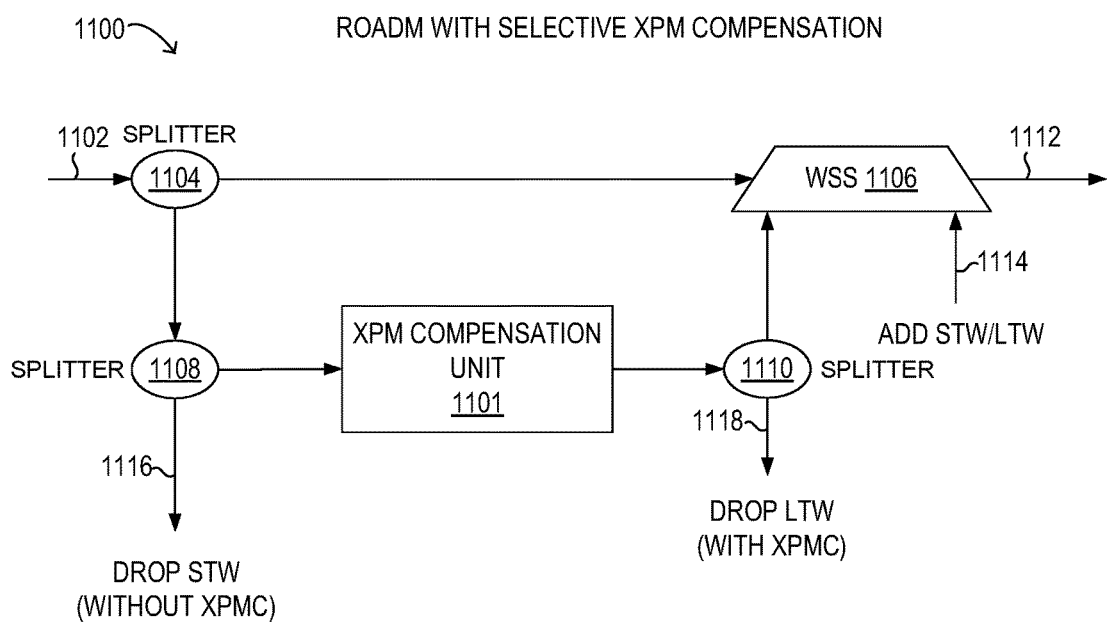
FIG. 11 is a block diagram of selected elements of an embodiment of a ROADM with selective XPM compensation.

Referring now to FIG. 11, a block diagram of selected elements of an embodiment of a ROADM 1100 with selective XPM compensation is shown. In ROADM 1100, a post-compensation scheme is shown in which XPM is compensated after transmission of the optical signal, and added optical signals are not XPM compensated. ROADM 1100 may accordingly be used along the optical path of the optical signal, such as within a node in optical network 101. It is noted that ROADM 1100 may be implemented with fewer or more elements than shown in FIG. 11 in different embodiments. In FIG. 11, an XPM compensation unit 1101 is shown implemented in ROADM 1100 and is used to describe the functionality of ROADM 1100 below. As shown in FIG. 11, XPM compensation unit 1101 may represent any of the example configurations 300, 400, 500, or 600 described previously (see FIGS. 3-6). In particular, XPM compensation unit 1101 includes certain wavelengths selective elements, such as OPBF 308 or WSS 404 to enable separation of a first group of STW from a second group of LTW, as shown in spectrum 1000 of FIG. 10, for wavelength-specific optical processing, including XPM compensation.

Accordingly, FIG. 11, ROADM 1100 may receive an optical signal 1102 comprising a plurality of wavelengths, such as the exemplary optical signal shown in spectrum 1000 of FIG. 10, which is spectrally divided into the first group of STW and the second group of LTW, as explained above. At a fiber optic splitter 1104, which may be a passive splitter, the optical signal 1102 may be split, such as with equal optical power, to be directed to WSS 1106 and to a splitter 1108, with each output from splitter 1104 including the first group of STW and the second group of LTW. WSS 1106 may receive both the STW and the LTW from splitter 1104, but may transmit only certain ones of the STW to an output optical signal 1112, while blocking the LTW arriving directly from splitter 1104, which are not XPM compensated. In this manner, any selected ones of the STW in optical signal 1102 may be passed through to output optical signal 1112 without XPM compensation.

Additionally, splitter 1108 may receive both the first group of STW and the second group of LTW from splitter 1104. Splitter 1108, which may be a passive splitter with the corresponding reduction of output optical power, may output the first group of STW and the second group of LTW to XPM compensation unit 1101 and to a drop port 1116.

At drop port 1116, certain ones of the STW may be dropped without XPM compensation, such as the STW where ROADM 1100 is at the destination node. Specifically, the STW dropped at drop port 1116 may be received by one or more receivers (not shown in FIG. 11) having spectral filtering capability in order to receive and demodulate a single wavelength per receiver. Thus, when multiple STW are dropped at drop port 1116, multiple corresponding receivers are used. The LTW arriving at drop port 1116, as well as the STW that are not dropped, will not be received by any receivers, and so, will effectively be terminated. For the specific STW that are dropped and received at drop port 1116, WSS 1106 may be configured to block these specific STW from output optical signal 1112, to prevent duplicate transmission of the same STW. From splitter 1108, both the first group of STW and the second group of LTW may be passed to XPM compensation unit 1101 for XPM compensation, as disclosed herein.

At XPM compensation unit 1101, where both the first group of STW and the second group of LTW are received from splitter 1108, the first group of STW may be terminated, while the second group of LTW may be XPM compensated, as described above in detail. For example, OBPF 308 or WSS 404 may be used to terminate the STW in XPM compensation unit 1101, in different implementations.

After XPM compensation unit 1101, a second fiber optic splitter 1110, which may be a passive splitter, may output the XPM compensated LTW to both WSS 1106 and to a drop port 1118. At drop port 1118, the XPM compensated LTW arriving at their respective destination node at ROADM 1100 are dropped and received, as described above for drop port 1116. As with drop port 1116, for the specific XPM compensated LTW that are dropped at drop port 1118, WSS 1106 may be configured to block the specific LTW dropped at drop port 1118 from output optical signal 1112, to maintain the desired single optical path for the dropped LTW. The LTW that are not dropped at drop port 1118 are switched by WSS 1106 to output optical signal 1112 for inclusion in the second group of LTW, which are XPM compensated.

Also shown in ROADM 1100 is input degree 1114 to WSS 1106, which may be used to add new STW or LTW or both to output optical signal 1112, and which may be XPM compensated in a subsequent ROADM node (not shown). Although ROADM 1100 has been shown arranged using three fiber optic splitters 1104, 1108, and 1110, it will be understood that different numbers of fiber optic splitters, optical filters, and demultiplexers may be used in different arrangements. In certain embodiments, one or more additional WSS (not shown in FIG. 11) may be used, for example in place of splitters 1104, 1108, 1110, to enable dynamic or programmable switching of wavelengths or for desired control of optical power.

Figure 12:
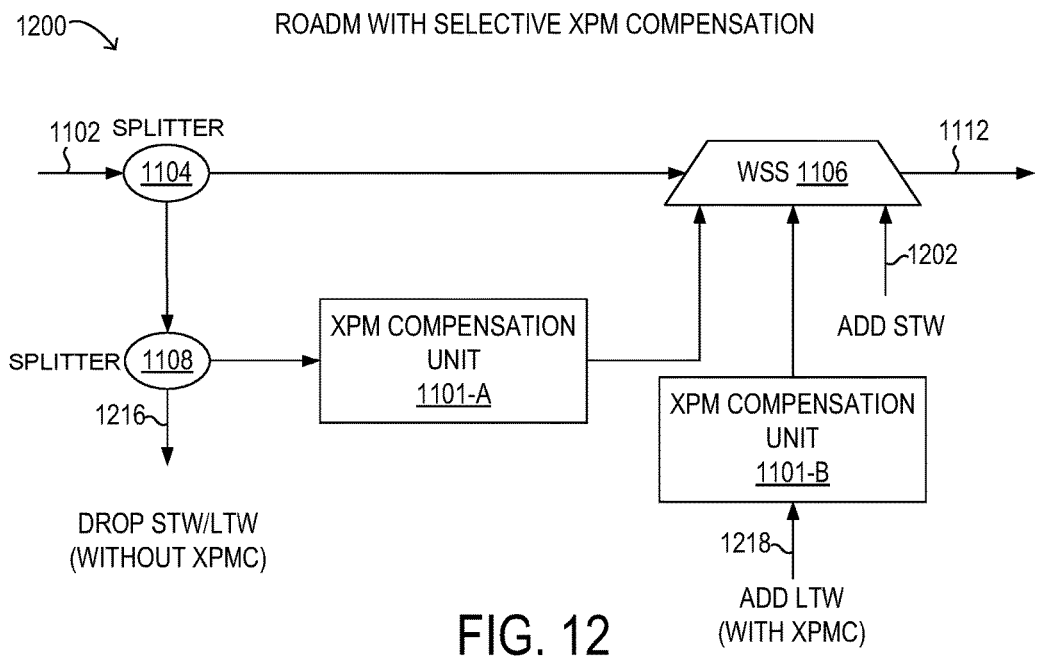
FIG. 12 is a block diagram of selected elements of an embodiment of a ROADM with selective XPM compensation.

Referring now to FIG. 12, a block diagram of selected elements of an embodiment of a ROADM 1200 with selective XPM compensation is shown. In ROADM 1200, a pre-compensation scheme is shown in which XPM may be compensated prior to transmission of added LTW. ROADM 1200 may accordingly be used along the optical path of the optical signal, such as within a node in optical network 101 that interconnects two network segments. It is noted that ROADM 1200 may be implemented with fewer or more elements than shown in FIG. 12 in different embodiments. In FIG. 12, XPM compensation units 1101-A, 1101-B are shown implemented in ROADM 1200 and are used to describe the functionality of ROADM 1200 below. As shown in FIG. 12, XPM compensation units 1101-A, 1101-B may represent any of the example configurations 300, 400, 500, or 600 described previously (see FIGS. 3-6). In particular, XPM compensation units 1101-A, 1101-B includes certain wavelengths selective elements, such as OPBF 308 or WSS 404 to enable separation of a first group of STW from a second group of LTW, as shown in spectrum 1000 of FIG. 10, for wavelength-specific optical processing, including XPM compensation.

ROADM 1200 in FIG. 12 is similar to the operation of ROADM 1100 described above in FIG. 11. Specifically, ROADM 1200 may receive an optical signal 1102 comprising a plurality of wavelengths, such as the exemplary optical signal shown in spectrum 1000, which is spectrally divided into the first group of STW and the second group of LTW. At a fiber optic splitter 1104, which may be a passive splitter, the optical signal 1102 may be split, such as with equal optical power, to be directed to WSS 1106 and to a second splitter 1108, with each output from splitter 1104 including the first group of STW and the second group of LTW. At splitter 1108, a drop port 1216 may enable dropping of XPM uncompensated STW and LTW, such as when the dropped STW/LTW arrive at their destination node and are received by a receiver having spectral filtering capability to isolate a single wavelength using a single receiver. Thus, when multiple STW or LTW are dropped and received at drop port 1216, multiple corresponding receivers are used. The LTW/STW arriving at drop port 1216 that are not dropped will not be received by any receivers, and so, will effectively be terminated. For the specific STW/LTW dropped and received at drop port 1216, WSS 1106 will be configured to terminate the dropped STW/LTW and block their transmission to output optical signal 1112. Also from splitter 1108, the first group of STW and the second group of LTW are received at XPM compensation unit 1101-A. At XPM compensation unit 1101-A, the first group of STW may be terminated, such as by wavelength specific blocking using OBPF 308 or WSS 404. Then, at XPM compensation unit 1101-A, the second group of LTW may be XPM compensated and output to WSS 1106. Another XPM compensation unit 1101-B may receive added LTW without XPM compensation at an add port 1218 and may XPM compensate the added LTW. From XPM compensation unit 1101-B, the XPM compensated added LTW are then output to WSS 1106.

Also shown in ROADM 1200 is input degree 1202 to WSS 1106, which may be used to add additional STW to output optical signal 1112. Although ROADM 1200 has been shown arranged using fiber optic splitters 1104 and 1108, it will be understood that different numbers of fiber optic splitters, optical filters, and demultiplexers may be used in different arrangements. In certain embodiments, one or more additional WSS (not shown in FIG. 12) may be used, for example in place of splitter 1104 to enable dynamic or programmable switching of wavelengths or for desired control of optical power.

Figure 13:
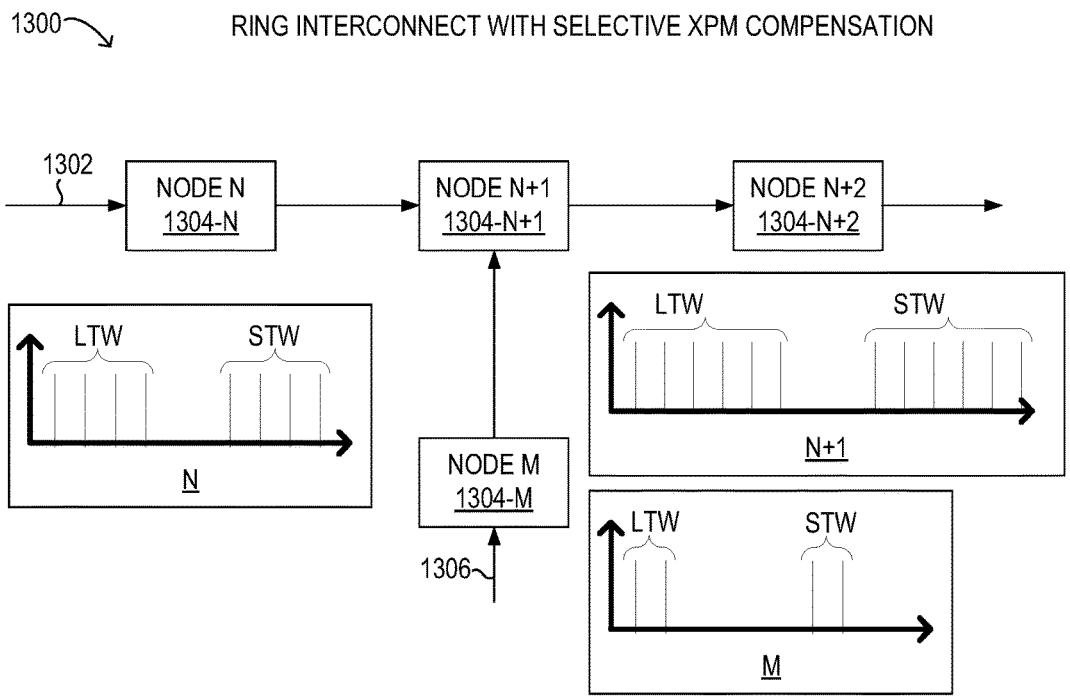
FIG. 13 is a network diagram of selected elements of an embodiment of a ring interconnect with selective XPM compensation.
Figure 14:
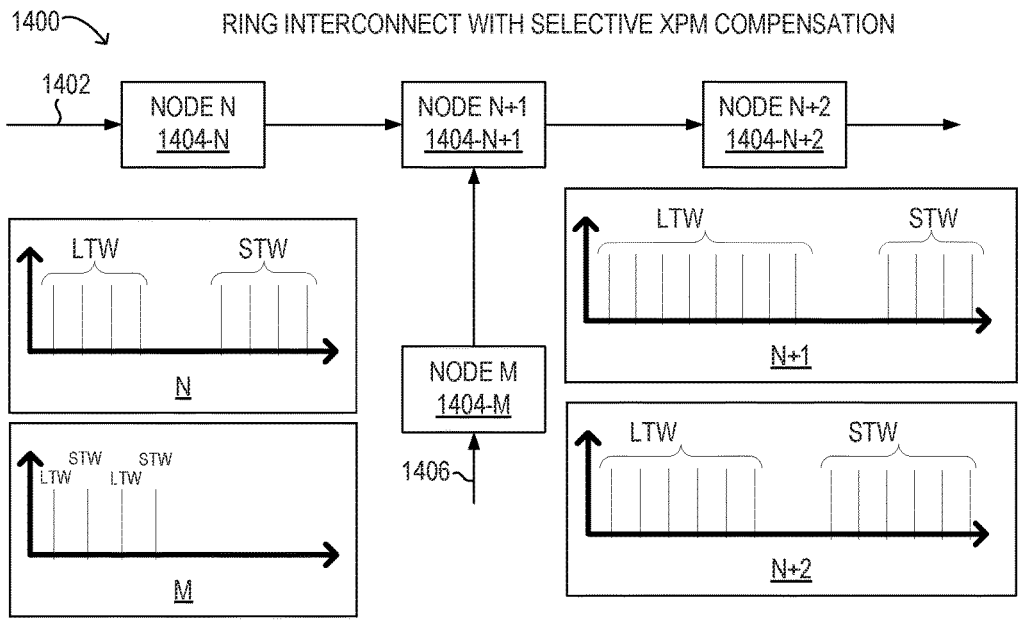
FIG. 14 is a network diagram of selected elements of an embodiment of a ring interconnect with selective XPM compensation.
Figure 15:
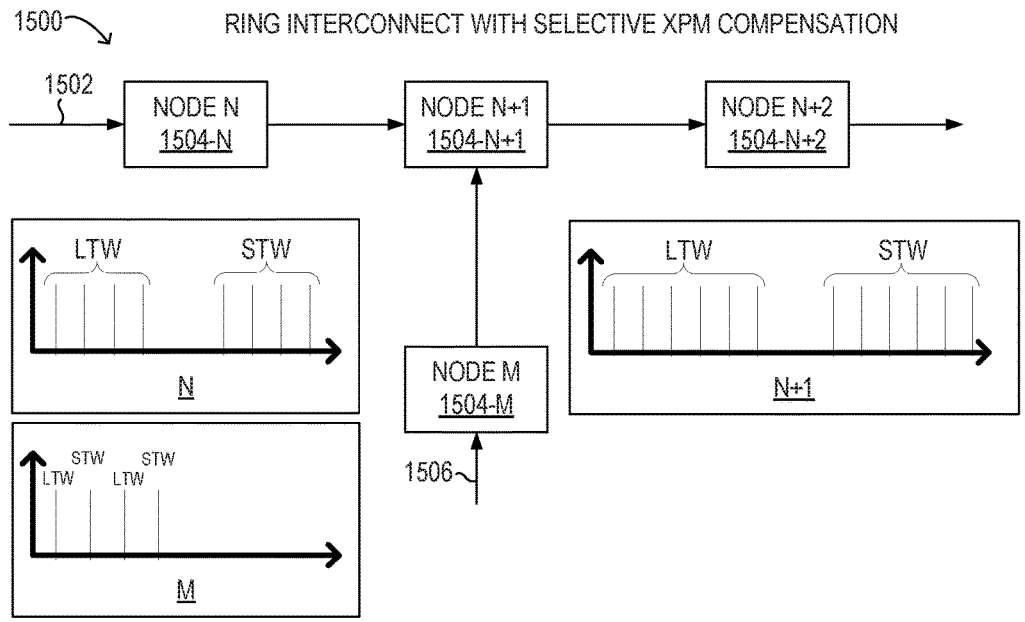
FIG. 15 is a network diagram of selected elements of an embodiment of a ring interconnect with selective XPM compensation.

FIGS. 13-15 show different embodiments of ring interconnects where two optical networks merge. Specifically, a first ring having nodes N, N+1, and N+2 is shown merging at node N+1 with another ring having node M. In the respective figures, certain spectra are depicted showing an output of the optical signal for each node respectively labeled in the spectra.

Referring to FIG. 13, a network diagram of selected elements of an embodiment of a ring interconnect 1300 with selective XPM compensation is shown. In ring interconnect 1300, a first ring 1302 is comprised of nodes 1304-N, 1304-N+1, and 1304-N+2. A second ring 1306 having node 1304-M interconnects to first ring 1302 at node 1304 N+1. In ring interconnect 1300, nodes 1304 are assumed to include XPM compensation, such as by including a ROADM with selective XPM compensation, as described herein. Accordingly, first ring 1302 and second ring 1306 are XPM compensated rings.

After node 1304-N along first ring 1302, spectra N shows 4 wavelengths each for the LTW group and the STW group, respectively. After node 1304-M along second ring 1306, spectra M shows 2 wavelengths each for the LTW group and the STW group, respectively. After second ring 1306 merges into first ring 1302 at node 1304-N+1, spectral N+1 shows that each LTW group and STW group now includes 6 wavelengths. Accordingly, nodes 1304 in ring interconnect 1300 may perform XPM compensation for the LTW group, while leaving the STW group XPM uncompensated by passing through the STW group.

In one embodiment of ring interconnect 1300, first ring 1302 and second ring 1306 have the same fiber type. In another embodiment of ring interconnect 1300, first ring 1302 may have a SMF-type fiber, while second ring 1306 has a NZ-DSF-type fiber. Because first ring 1302 and second ring 1306 are both XPM compensated for LTW, even though the NZ-DSF-type fiber has greater nonlinearity than the SMF-type fiber, the STW may remain uncompensated.

Referring to FIG. 14, a network diagram of selected elements of an embodiment of a ring interconnect 1400 with selective XPM compensation is shown. In ring interconnect 1400, a first ring 1402 is comprised of nodes 1404-N, 1404-N+1, and 1404-N+2. A second ring 1406 having node 1404-M interconnects to first ring 1402 at node 1404 N+1. In ring interconnect 1400, nodes 1404 in first ring 1402 are assumed to include XPM compensation, such as by including a ROADM with selective XPM compensation, as described herein, while nodes 1404 in second ring 1406 are XPM uncompensated. Accordingly, first ring 1402 is XPM compensated, while second ring 1406 is not XPM compensated. Furthermore, in ring interconnect 1400, first ring 1402 may have a SMF-type fiber, while second ring 1406 has a NZ-DSF-type fiber, which has stronger fiber nonlinearity.

After node 1404-N along first ring 1402, spectra N shows 4 wavelengths each for the LTW group and the STW group, respectively. After node 1404-M along second ring 1406, spectra M shows 2 wavelengths each for LTW and STW that are intermingled and are not grouped, representing any intermingled composition of LTW and STW. In this arrangement, even the STW arriving at node 1404-N+1 may benefit from XPM compensation. In this case, all the wavelengths in spectra M are added to LTW in spectra N+1 at node 1404-N+1, which now has 8 LTW. Thus, node 1404-N+1 may treat all incoming wavelengths from second ring 1406 as LTW for XPM compensation purposes, and may not distinguish the incoming wavelengths from second ring 1406 as STW or LTW. After XPM compensation of the 8 LTW at node 1404-N+1, at node 1401-N+2, the STW from second ring 1406 are reassigned back to STW by using wavelength conversion, such as O-E-O conversion, a wavelength shifter, or by pre-planning a specific wavelength assignment for first ring 1402 and second ring 1406. For example, node 1404-N+2 may receive wavelength assignment information from a network controller (see FIG. 17) that tracks or controls the wavelength assignments in each node 1404, and can determine which LTW wavelength in spectra N+1 should be reassigned to STW in spectra N+2. After node 1404-N+2, the LTW group and the STW group have been reassigned, as shown in spectra N+2, which has 4 LTW and 4 STW grouped together, respectively.

Referring to FIG. 15, a network diagram of selected elements of an embodiment of a ring interconnect 1500 with selective XPM compensation is shown. In ring interconnect

1500, a first ring 1502 is comprised of nodes 1504-N, 1504-N+1, and 1504-N+2. A second ring 1506 having node 1504-M interconnects to first ring 1502 at node 1504 N+1. In ring interconnect 1500, nodes 1504 in first ring 1502 are assumed to include XPM compensation, such as by including a ROADM with selective XPM compensation, as described herein, while nodes 1504 in second ring 1506 are XPM uncompensated. Accordingly, first ring 1502 is XPM compensated, while second ring 1506 is not XPM compensated.

In one embodiment of ring interconnect 1500, first ring 1502 and second ring 1506 have the same fiber type. In another embodiment of ring interconnect 1500, first ring 1502 may have a NZ-DSF-type fiber, while second ring 1506 has a SMF-type fiber, which has less fiber nonlinearity.

After node 1504-N along first ring 1502, spectra N shows 4 wavelengths each for the LTW group and the STW group, respectively. After node 1504-M along second ring 1506, spectra M shows 2 wavelengths each for LTW and STW that are intermingled and are not grouped, representing any intermingled composition of LTW and STW. In this arrangement, the STW arriving at node 1504-N+1 may be transmitted without XPM compensation, whether the fiber types are the same or second ring 1506 has the SMF-type fiber, while first ring 1502 has the NZ-DSF-type fiber. In this case, all the LTW in spectra M are added to LTW in spectra N+1 at node 1504-N+1, and all the STW in spectra M are added to STW in spectra N+1 at node 1504-N+1. The STW and LTW from second ring 1506 are reassigned by using wavelength conversion, such as O-E-O conversion, a wavelength shifter, or by pre-planning a specific wavelength assignment for first ring 1502 and second ring 1506. For example, node 1504-N+2 may receive wavelength assignment information from a network controller (see FIG. 17) that tracks or controls the wavelength assignments in each node 1504, and can determine which wavelengths in spectra M are STW or LTW. After node 1504-N+1, the LTW group and the STW group have been assigned, as shown in spectra N+1 in FIG. 15, which has 6 LTW and 6 STW grouped together, respectively.

Figure 16:
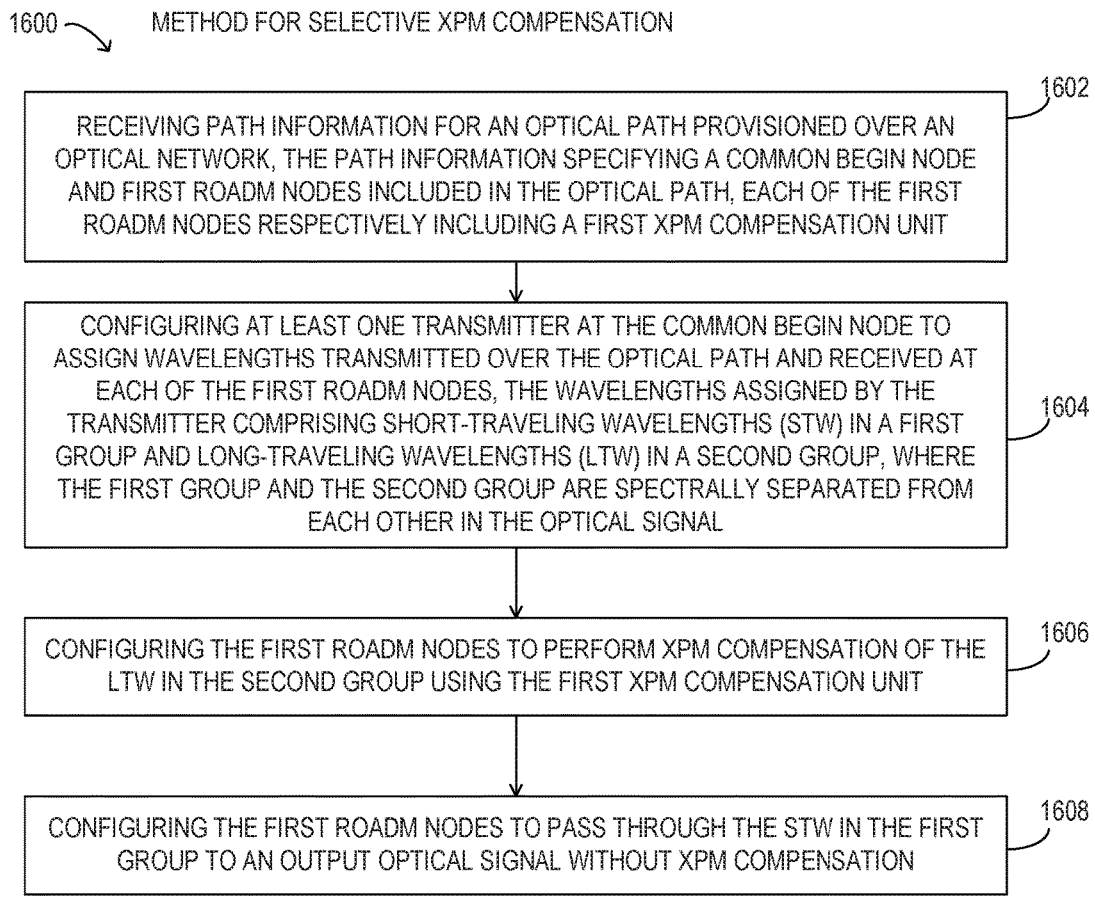
FIG. 16 is a flow chart of selected elements of a method for selective XPM compensation.

Referring now to FIG. 16, a flowchart of selected elements of an embodiment of method 1600 for selective XPM compensation, as described herein, is depicted. In various embodiments, method 1600 may be performed by ROADM node 1100 or 1200 in an optical network, for example, using XPM compensation unit 1101. It is noted that certain operations described in method 1600 may be optional or may be rearranged in different embodiments.

Method 1600 may begin at step 1602 by receiving path information for an optical path provisioned over an optical network, the path information specifying a common begin node and first ROADM nodes included in the optical path, each of the first ROADM nodes respectively including a first XPM compensation unit. At step 1604, at least one transmitter is configured at the common begin node to assign wavelengths transmitted over the optical path and received at each of the first ROADM nodes, the wavelengths assigned by the transmitter comprising short-traveling wavelengths (STW) in a first group and long-traveling wavelengths (LTW) in a second group, where the first group and the second group are spectrally separated from each other in the optical signal. At step 1606, the first ROADM nodes are configured to perform XPM compensation of the LTW in the second group using the first XPM compensation unit. At step 1608, the first ROADM nodes are configured to pass through the STW in the first group to an output optical signal without XPM compensation.

Figure 17:
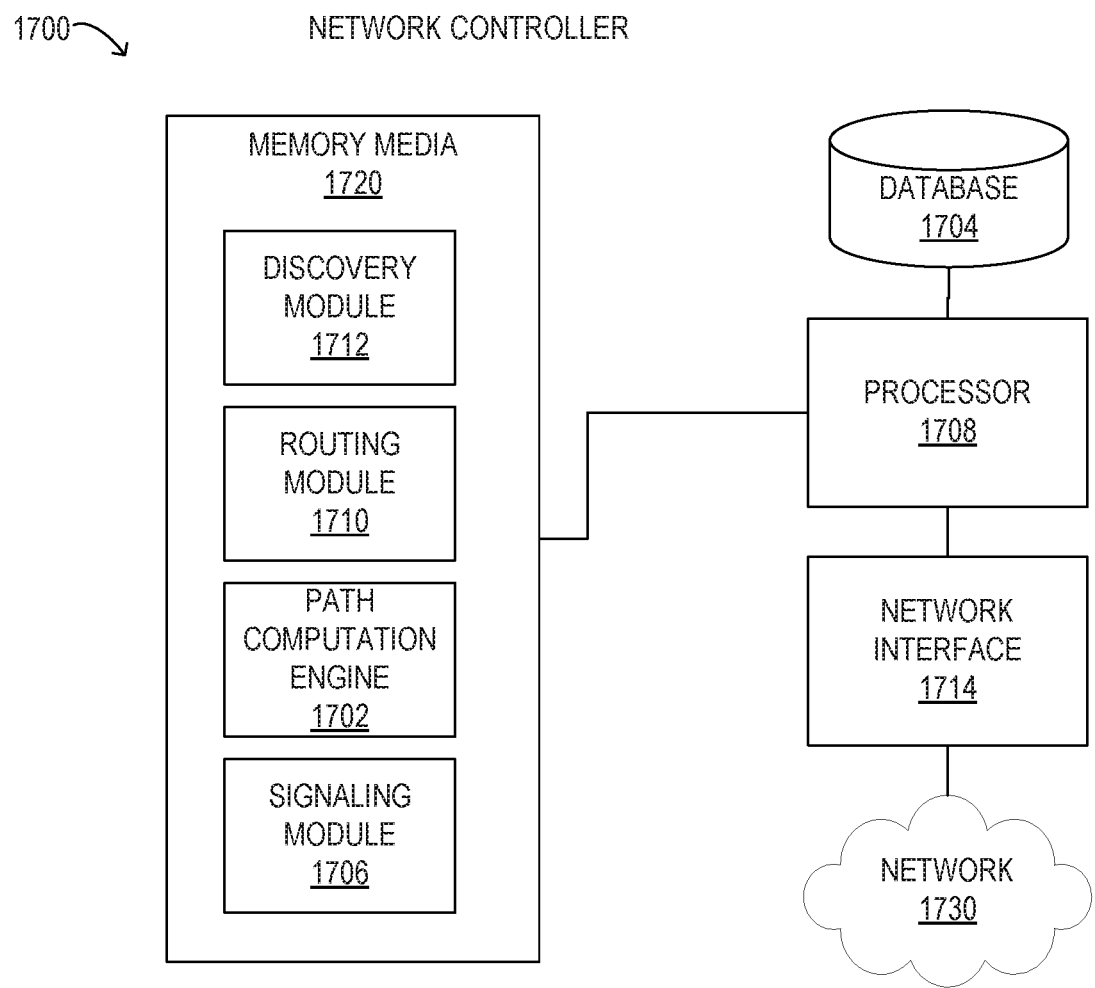
FIG. 17 is a block diagram of selected elements of an embodiment of network controller.

Referring now to FIG. 17, a block diagram of selected elements of an embodiment of a network controller 1700 for implementing control plane functionality in optical networks, such as, for example, in optical transport network 101 (see FIG. 1), is illustrated. Furthermore, it is noted that network controller 1700 may function as, or may further include, a software-defined networking (SDN) controller. A control plane may include functionality for network intelligence and control and may comprise applications that support the ability to establish network services, including applications or modules for discovery, routing, path computation, and signaling, as will be described in further detail. In particular, network controller 1700 may represent at least certain portions of a control system used to implement XPM and selective per-node XPM, as disclosed herein. For example network controller 1700 may send appropriate commands to transmitter 102, receiver 112, and ROADM nodes to implement selective per-node XPM, as well as other operations disclosed herein.

In FIG. 17, the control plane applications executed by network controller 1700 may work together to automatically establish services within the optical network. Discovery module 1712 may discover local links connecting to neighbors. Routing module 1710 may broadcast local link information to optical network nodes while populating database 1704. When a request for service from the optical network is received, path computation engine 1702 may be called to compute a network path using database 1704. This network path may then be provided to signaling module 1706 to establish the requested service.

As shown in FIG. 17, network controller 1700 includes processor 1708 and memory media 1720, which may store executable instructions (i.e., executable code) that may be executable by processor 1708, which has access to memory media 1720. Processor 1708 may execute instructions that cause network controller 1700 to perform the functions and operations described herein. For the purposes of this disclosure, memory media 1720 may include non-transitory computer-readable media that stores data and instructions for at least a period of time. Memory media 1720 may comprise persistent and volatile media, fixed and removable media, and magnetic and semiconductor media. Memory media 1720 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory, non-transitory media, or various combinations of the foregoing. Memory media 1720 is operable to store instructions, data, or both. Memory media 1720 as shown includes sets or sequences of instructions that may represent executable computer programs, namely, path computation engine 1702, signaling module 1706, discovery module 1712, and routing module 1710.

Also shown included with network controller 1700 in FIG. 17 is network interface 1714, which may be a suitable system, apparatus, or device operable to serve as an interface between processor 1708 and network 1730. Network interface 1714 may enable network controller 1700 to communicate over network 1730 using a suitable transmission protocol or standard. In some embodiments, network interface 1714 may be communicatively coupled via network 1730 to a network storage resource. In some embodiments, network 1730 represents at least certain portions of optical transport network 101. Network 1730 may also include certain portions of a network using galvanic or electronic media. In certain embodiments, network 1730 may include at least certain portions of a public network, such as the Internet. Network 1730 may be implemented using hardware, software, or various combinations thereof.

In certain embodiments, network controller 1700 may be configured to interface with a person (a user) and receive data about the optical signal transmission path. For example, network controller 1700 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, network controller 1700 may be configured to receive data about the optical signal transmission path from a device such as another computing device or a network node, for example via network 1730.

As shown in FIG. 17, in some embodiments, discovery module 1712 may be configured to receive data concerning an optical signal transmission path in an optical network and may be responsible for discovery of neighbors and links between neighbors. In other words, discovery module 312 may send discovery messages according to a discovery protocol, and may receive data about the optical signal transmission path. In some embodiments, discovery module 1712 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 17, routing module 1710 may be responsible for propagating link connectivity information to various nodes within an optical network, such as optical transport network 101. In particular embodiments, routing module 1710 may populate database 1704 with resource information to support traffic engineering, which may include link bandwidth availability. Accordingly, database 1704 may be populated by routing module 1710 with information usable to determine a network topology of an optical network.

Path computation engine 1702 may be configured to use the information provided by routing module 1710 to database 1704 to determine transmission characteristics of the optical signal transmission path, including an optical path length. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 1702 may consider the interplay between the transmission degradation factors. In various embodiments, path computation engine 1702 may generate values for specific transmission degradation factors. Path computation engine 1702 may further store data describing the optical signal transmission path in database 1704.

In FIG. 17, signaling module 1706 may provide functionality associated with setting up, modifying, and tearing down end-to-end networks services in an optical network, such as optical transport network 101. For example, when an ingress node in the optical network receives a service request, network controller 1700 may employ signaling module 1706 to request a network path from path computation engine 1702 that may be optimized according to different criteria, such as bandwidth, cost, etc. When the desired network path is identified, signaling module 1706 may then communicate with respective nodes along the network path to establish the requested network services. In different embodiments, signaling module 1706 may employ a signaling protocol to propagate subsequent communication to and from nodes along the network path.

In operation, the modules of network controller 1700 may implement various aspects of network management with selective per-node XPM compensation, as disclosed herein.

As disclosed herein, a method and system for selective and per-node XPM compensation may separate wavelengths into short traveling wavelengths (STW) and long traveling wavelengths (LTW) based on transmission distance over their respective optical paths. XPM compensation at ROADM nodes may be selectively performed for the LTW, while the STW may be passed through without XPM compensation, among other functionality at the ROADM nodes.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A reconfigurable optical add-drop multiplexer (ROADM) for selective per-node cross-phase modulation (XPM) compensation, the ROADM comprising:
   a first optical splitter enabled to receive an optical signal comprising short-traveling wavelengths (STW) in a first group and long-traveling wavelengths (LTW) in a second group, wherein the first group and the second group are spectrally separated from each other in the optical signal;
   a wavelength selective switch (WSS) enabled to receive the optical signal from the first optical splitter, wherein the WSS is enabled to pass through the STW to the first group in an output optical signal;
   a second optical splitter enabled to receive the optical signal from the first optical splitter; and
   a first cross-phase modulation (XPM) compensation unit enabled to receive the STW and the LTW from the second optical splitter, wherein the LTW are XPM compensated by the first XPM compensation unit and output as XPM compensated LTW, and wherein the STW are terminated at the first XPM compensation unit.

2. The ROADM of claim 1, further comprising:
   a first drop port at the second optical splitter enabled to drop at least one of the STW without XPM compensation, wherein the WSS is enabled to terminate the STW dropped at the first drop port.

3. The ROADM of claim 1, further comprising:
   a third optical splitter enabled to receive the XPM compensated LTW from the first XPM compensator and to send the XPM compensated LTW to the WSS, wherein the WSS is enabled to switch the XPM compensated LTW to the second group in the output optical signal; and a second drop port at the third optical splitter enabled to drop at least one of the XPM compensated LTW, wherein the WSS is enabled to terminate the XPM compensated LTW dropped at the second drop port.

4. The ROADM of claim 1, further comprising:
a first add port at the WSS enabled to add at least one new STW to the first group in the output optical signal.

5. The ROADM of claim 4, further comprising:
a second cross-phase modulation (XPM) compensation unit comprising a second add port and an output to the WSS, wherein the second XPM compensation unit is enabled to add at least one new LTW to the second group in the output optical signal and is enabled to XPM compensate the new LTW.

6. The ROADM of claim 5, further comprising:
a wavelength conversion unit enabled to shift wavelengths of at least one of the new LTW and the new STW.

7. An optical system for selective per-node cross-phase modulation (XPM) compensation, the optical system comprising:
an optical network having a plurality of nodes, at least some of the nodes comprising a reconfigurable optical add-drop multiplexer (ROADM) node including a first cross-phase modulation (XPM) compensation unit;
a network controller comprising a processor and memory media accessible to the processor, the memory media storing instructions executable by the processor for:
receiving path information for an optical path provisioned over the optical network, the path information specifying a common begin node and first ROADM nodes included in the optical path, each of the first ROADM nodes respectively including the first XPM compensation unit;
configuring at least one transmitter at the common begin node to assign wavelengths transmitted over the optical path and received at each of the first ROADM nodes, the wavelengths assigned by the transmitter comprising short-traveling wavelengths (STW) in a first group and long-traveling wavelengths (LTW) in a second group, wherein the first group and the second group are spectrally separated from each other in the optical signal; and
configuring the first ROADM nodes to perform XPM compensation of the LTW in the second group using the first XPM compensation unit.

8. The optical system of claim 7, wherein the instructions further comprise instructions for:
configuring the first ROADM nodes to pass through at least one of the STW in the first group to an output optical signal without XPM compensation.

9. The optical system of claim 7, further comprising:
second ROADM nodes, selected from at least some of the first ROADM nodes, and further comprise a second XPM compensation unit including a first add port for receiving at least one new LTW added to the optical signal, and wherein the instructions further include instructions for:
configuring the second ROADM nodes to XPM compensate the new LTW received at the first add port using the second XPM compensation unit.

10. The optical system of claim 9, wherein at least some of the second ROADM nodes include a second add port enabled to receive at least one new STW that is added to the optical signal, and wherein the instructions further include instructions for:

configuring the second ROADM nodes to add the new STW to first group in the output optical signal from the second add port without XPM compensation of the new STW.

11. The optical system of claim 10, wherein at least some of the first ROADM nodes include a wavelength conversion unit enabled to shift wavelengths of at least one of the new LTW and the new STW.

12. The optical system of claim 7, wherein at least some of the first ROADM nodes include a first drop port enabled to drop at least one of the STW without XPM compensation.

13. The optical system of claim 12, wherein at least some of the first ROADM nodes include a second drop port enabled to drop at least one of the XPM compensated LTW.

14. A method for selective per-node cross-phase modulation (XPM) compensation of optical signals, the method comprising:
receiving path information for an optical path provisioned over an optical network, the path information specifying a common begin node and first reconfigurable optical add-drop multiplexer (ROADM) nodes included in the optical path, each of the first ROADM nodes respectively including a first XPM compensation unit;
configuring at least one transmitter at the common begin node to assign wavelengths transmitted over the optical path and received at each of the first ROADM nodes, the wavelengths assigned by the transmitter comprising short-traveling wavelengths (STW) in a first group and long-traveling wavelengths (LTW) in a second group, wherein the first group and the second group are spectrally separated from each other in the optical signal; and
configuring the first ROADM nodes to perform XPM compensation of the LTW in the second group using the first XPM compensation unit.

15. The method of claim 14, further comprising:
configuring the first ROADM nodes to pass through the STW in the first group to an output optical signal without XPM compensation.

16. The method of claim 14, wherein second ROADM nodes, selected from at least some of the first ROADM nodes, further comprise a second XPM compensation unit including a first add port for receiving at least one new LTW that is added to the optical signal, and further comprising:
configuring the second ROADM nodes to XPM compensate the new LTW received at the first add port using the second XPM compensation unit.

17. The method of claim 16, wherein at least some of the second ROADM nodes include a second add port enabled to receive at least one new STW that is added to the optical signal, and further comprising:
configuring the second ROADM nodes to add the new STW from the second add port to the first group in the output optical signal without XPM compensation of the new STW.

18. The method of claim 17, further comprising:
shifting wavelengths of at least one of the new LTW and the new STW using a wavelength conversion unit included with at least some of the first ROADM nodes.

19. The method of claim 14, further comprising:
dropping at least one of the STW without XPM compensation from the optical signal using a first drop port included with at least some of the first ROADM nodes.

20. The method of claim 19, further comprising:
dropping at least one of the XPM compensated LTW using a second drop port included with at least some of the first ROADM nodes.

* * * * *